US012015788B2

(12) United States Patent
Sarwer et al.

(10) Patent No.: US 12,015,788 B2
(45) **Date of Patent: *Jun. 18, 2024**

(54) VIDEO PROCESSING METHOD AND APPARATUS FOR USING PALETTE MODE

(71) Applicant: ALIBABA GROUP HOLDING LIMITED, Grand Cayman (KY)

(72) Inventors: Mohammed Golam Sarwer, San Mateo, CA (US); Ru-Ling Liao, Beijing (CN); Yan Ye, San Mateo, CA (US); Jiancong Luo, San Mateo, CA (US); Jie Chen, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 13 days.

This patent is subject to a terminal disclaimer.

(21) Appl. No.: 17/932,841

(22) Filed: Sep. 16, 2022

(65) Prior Publication Data

US 2023/0011928 A1 Jan. 12, 2023

Related U.S. Application Data

(63) Continuation of application No. 17/062,135, filed on Oct. 2, 2020, now Pat. No. 11,451,796.

(Continued)

(51) Int. Cl.
*H04N 19/174* (2014.01)
*H04N 19/105* (2014.01)
(Continued)

(52) U.S. Cl.
CPC ......... *H04N 19/174* (2014.11); *H04N 19/105* (2014.11); *H04N 19/159* (2014.11); *H04N 19/186* (2014.11); *H04N 19/96* (2014.11)

(58) Field of Classification Search
CPC .. H04N 19/174; H04N 19/105; H04N 19/159; H04N 19/186; H04N 19/96;
(Continued)

(56) References Cited

U.S. PATENT DOCUMENTS

2016/0007042 A1 1/2016 Pu et al.
2016/0057447 A1 2/2016 Pu et al.
(Continued)

FOREIGN PATENT DOCUMENTS

CN 105556974 A 5/2016
CN 105874796 A 8/2016
(Continued)

OTHER PUBLICATIONS

"Requirements for a Future Video Coding Standard v5," International Organisation for Standardisation, Torino, IT, 14 pages (2017).

(Continued)

*Primary Examiner* — Nam D Pham
(74) *Attorney, Agent, or Firm* — Finnegan Henderson, Farabow, Garrett & Dunner, LLP

(57) ABSTRACT

The present disclosure provides systems and methods for signaling and using a palette mode in video processing. According to certain disclosed embodiments, an exemplary video processing method includes: receiving a first palette entry for palette coding a target coding unit (CU); determining whether the target CU is part of a single-tree slice; determining whether the target CU is coded with separate luma and chroma trees; and in response to the target CU being determined to be part of a single-tree slice and be coded with separate luma and chroma trees, decoding a first component of the target CU based on the first palette entry, and decoding a second component of the target CU based on a default palette entry.

13 Claims, 27 Drawing Sheets

Table 2: Exemplary coding unit syntax table for disallowing palette mode for a CU

<table>
<tr><td>coding_unit( x0, y0, cbWidth, cbHeight, cqtDepth, treeType, modeType ) {</td><td>Descriptor</td></tr>
<tr><td>chType = treeType = = DUAL_TREE_CHROMA ? 1 : 0</td><td></td></tr>
<tr><td>if( slice_type != I || sps_ibc_enabled_flag ) {</td><td></td></tr>
<tr><td>if( treeType != DUAL_TREE_CHROMA &&<br>( ( !( cbWidth = = 4 && cbHeight = = 4 ) && modeType != MODE_TYPE_INTRA )<br>|| ( sps_ibc_enabled_flag && cbWidth <= 64 && cbHeight <= 64 ) ) )</td><td></td></tr>
<tr><td>cu_skip_flag[ x0 ][ y0 ]</td><td>ae(v)</td></tr>
<tr><td>if( cu_skip_flag[ x0 ][ y0 ] = = 0 && slice_type != I<br>&& !( cbWidth = = 4 && cbHeight = = 4 ) && modeType = = MODE_TYPE_ALL )</td><td></td></tr>
<tr><td>pred_mode_flag</td><td>ae(v)</td></tr>
<tr><td>if( ( ( slice_type = = I && cu_skip_flag[ x0 ][ y0 ] = =0 ) ||<br>( slice_type != I && ( CuPredMode[ chType ][ x0 ][ y0 ] != MODE_INTRA ||<br>( ( ( cbWidth = = 4 && cbHeight = = 4 ) || modeType = = MODE_TYPE_INTRA )<br>&& cu_skip_flag[ x0 ][ y0 ] = = 0 ) ) ) ) &&<br>cbWidth <= 64 && cbHeight <= 64 && modeType != MODE_TYPE_INTER &&<br>sps_ibc_enabled_flag && treeType != DUAL_TREE_CHROMA )</td><td></td></tr>
<tr><td>pred_mode_ibc_flag</td><td>ae(v)</td></tr>
<tr><td>}</td><td></td></tr>
<tr><td>disAllowPltMode = (treeType != SINGLE_TREE) && (slice_type != I || qtbtt_dual_tree_intra_flag == 0);</td><td></td></tr>
<tr><td>if( CuPredMode[ chType ][ x0 ][ y0 ] = = MODE_INTRA && sps_palette_enabled_flag &&<br>cbWidth <= 64 && cbHeight <= 64 && cu_skip_flag[ x0 ][ y0 ] = = 0 &&<br>modeType != MODE_TYPE_INTER && disAllowPltMode == 0)</td><td></td></tr>
<tr><td>pred_mode_plt_flag</td><td>ae(v)</td></tr>
</table>

801

Related U.S. Application Data

(60) Provisional application No. 62/952,426, filed on Dec. 22, 2019, provisional application No. 62/943,083, filed on Dec. 3, 2019.

(51) Int. Cl.
*H04N 19/159* (2014.01)
*H04N 19/186* (2014.01)
*H04N 19/96* (2014.01)

(58) Field of Classification Search
CPC .... H04N 19/182; H04N 19/157; H04N 19/44; H04N 19/55; H04N 19/463
USPC ..................................................... 375/240.02
See application file for complete search history.

(56) References Cited

U.S. PATENT DOCUMENTS

| | | | | |
|---|---|---|---|---|
| 2017/0078683 | A1* | 3/2017 | Seregin | H04N 19/463 |
| 2019/0246122 | A1 | 8/2019 | Zhang et al. | |
| 2019/0281311 | A1 | 9/2019 | Ye et al. | |

FOREIGN PATENT DOCUMENTS

| | | | |
|---|---|---|---|
| CN | 107079160 | A | 8/2017 |
| CN | 107211160 | A | 9/2017 |
| EP | 4 014 496 | | 6/2022 |
| WO | WO 2016/048092 | A1 | 3/2016 |
| WO | WO 2021/030570 | A1 | 2/2021 |

OTHER PUBLICATIONS

Bross et al., "Versatile Video Coding (Draft 7)," JVET-P2001-vE, 16th Meeting: Geneva, CH, Oct. 1-11, 2019, 488 pages.
Chao et al., "CE8-1.3: Line-based CG Palette Mode," JVET-P0077, 16th Meeting: Geneva, CH, Oct. 1-11, 2019, 6 pages.
Chen et al., Algorithm description for Versatile Video Coding and Test Model 7 (VTM 7), JVET-P2002-v1, 16th Meeting: Geneva, CH Oct. 1-11, 2019, 89 pages.
Chen et al., "Algorithm Description of Joint Exploration Test Model 7 (JEM 7)," JVET-G1001-v1, 7th Meeting: Torino, IT, Jul. 13-21, 2017, 50 pages.
International Telecommunications Union "Series H: Audiovisual and Multimedia Systems Infrastructure of audiovisual services—Coding of moving video", ITU-T Telecommunication Standardization Sector of ITU, Apr. 2013, 317 pages.
JEM, https://jvet.hhi.fraunhofer.de/svn/svn_HMJEMSoftware.
Joshi et al., "High Efficiency Video Coding (HEVC) Screen Content Coding: Draft 6," JCTVC-W1005-v4, 23rd Meeting: San Diego, USA, Feb. 19-26, 2016, 673 pages.
Lin et al., "CE3-2.1.1 and CE3-2.1.2: Removing 2×2, 2×4, and 4×2 chroma CBs", JVET-O0050, Gothenburg, Jul. 2019, 10 pages.
Segall et al., "Joint Call for Proposals on Video Compression with Capability beyond Hevc," JVET-H1002 (v6), 8th Meeting: Macao, CN, Oct. 18-24, 2017, 27 pages.
Sullivan et al., "Overview of the High Efficiency Video Coding (HEVC) Standard," IEE Transactions on Circuits and Systems for Video Technology, vol. 22, No. 12, pp. 1649-1668 (2012).
Bross et al., "Versatile Video Coding (Draft 9)," JVET-R2001-v1, 18th Meeting: by teleconference, Apr. 15-24, 2020, 515 pages.
Chen et al., "Algorithm description for Versatile Video Coding and Test Model 9 (VTM 9)," JVET-R2002-v2, 18th Meeting: by teleconference, Apr. 15-24, 2020, 97 pages.
European Patent Office Communication issued for Application No. 20897201.8 which encloses the extended European Search Report which includes pursuant to Rule 62 EPC, the Supplementary European Search Report (Art. 153(7) EPC) and the European search opinion, dated Dec. 20, 2022, 11 pages.
Chinese Search Report issued in corresponding Chinese Application No. 202080081908.3 (2 pages), Dec. 6, 2023.
Sun et al., "CE8: Palette mode with neighboring pixel copy (CE8-2.2)," JVETO0059, 15th Meeting: Gothenburg, SE Jul. 3-12, 2019, 5 pages.

* cited by examiner

Example of a block coded in palette mode palette predictor updating process

600

Table 1: Exemplary SPS syntax table for allowing palette mode for all chroma formats

| | | |
|---|---|---|
| 701 | ~~*if( chroma_format_idc = = 3 ) {*~~ | |
| | **sps_palette_enabled_flag** | u(1) |
| 702 | *if( chroma_format_idc = = 3 ) {* | |
| | **sps_act_enabled_flag** | u(1) |
| | *}* | |

FIG. 7

Table 2: Exemplary coding unit syntax table for disallowing palette mode for a CU

<table>
<tr><td>coding_unit( x0, y0, cbWidth, cbHeight, cqtDepth, treeType, modeType ) {</td><td>Descriptor</td></tr>
<tr><td>chType = treeType = = DUAL_TREE_CHROMA ? 1 : 0</td><td></td></tr>
<tr><td>if( slice_type != I || sps_ibc_enabled_flag ) {</td><td></td></tr>
<tr><td>if( treeType != DUAL_TREE_CHROMA &&<br>( ( !( cbWidth = = 4 && cbHeight = = 4 ) && modeType != MODE_TYPE_INTRA )<br>|| ( sps_ibc_enabled_flag && cbWidth <= 64 && cbHeight <= 64 ) ) )</td><td></td></tr>
<tr><td>cu_skip_flag[ x0 ][ y0 ]</td><td>ae(v)</td></tr>
<tr><td>if( cu_skip_flag[ x0 ][ y0 ] = = 0 && slice_type != I<br>&& !( cbWidth = = 4 && cbHeight = = 4 ) && modeType = = MODE_TYPE_ALL )</td><td></td></tr>
<tr><td>pred_mode_flag</td><td>ae(v)</td></tr>
<tr><td>if( ( ( slice_type = = I && cu_skip_flag[ x0 ][ y0 ] = =0 ) ||<br>( slice_type != I && ( CuPredMode[ chType ][ x0 ][ y0 ] != MODE_INTRA ||<br>( ( ( cbWidth = = 4 && cbHeight = = 4 ) || modeType = = MODE_TYPE_INTRA )<br>&& cu_skip_flag[ x0 ][ y0 ] = = 0 ) ) ) ) &&<br>cbWidth <= 64 && cbHeight <= 64 && modeType != MODE_TYPE_INTER &&<br>sps_ibc_enabled_flag && treeType != DUAL_TREE_CHROMA )</td><td></td></tr>
<tr><td>pred_mode_ibc_flag</td><td>ae(v)</td></tr>
<tr><td>}</td><td></td></tr>
<tr><td>disAllowPltMode = (treeType ! = SINGLE_TREE) && (slice_type ! = I ||<br>qtbtt_dual_tree_intra_flag == 0)</td><td></td></tr>
<tr><td>801 if( CuPredMode[ chType ][ x0 ][ y0 ] = = MODE_INTRA && sps_palette_enabled_flag &&<br>cbWidth <= 64 && cbHeight <= 64 && cu_skip_flag[ x0 ][ y0 ] = = 0 &&<br>modeType != MODE_TYPE_INTER && disAllowPltMode == 0)</td><td></td></tr>
<tr><td>pred_mode_plt_flag</td><td>ae(v)</td></tr>
</table>

FIG. 8

Table 3: Exemplary palette coding syntax table for applying palette mode to a CU <Part I>

| palette_coding( x0, y0, cbWidth, cbHeight, treeType ) { | **Descriptor** |
|---|---|
| startComp = ( treeType = = DUAL_TREE_CHROMA ) ? 1 : 0 | |
| numComps = ( treeType = = SINGLE_TREE ) ? 3 : ( treeType = = DUAL_TREE_CHROMA ) ? 2 : 1 | |
| 901 *localDualtree = treeType != SINGLE_TREE && ( slice_type != I \| \| ( slice_type = = I && qtbtt_dual_tree_intra_flag = = 0 ) ) ? 1 : 0* | |
| palettePredictionFinished = 0 | |
| NumPredictedPaletteEntries = 0 | |
| for( predictorEntryIdx = 0; predictorEntryIdx < PredictorPaletteSize[ startComp ] && !palettePredictionFinished && NumPredictedPaletteEntries < 31; predictorEntryIdx++ ) { | |
| **palette_predictor_run** | ae(v) |
| if( palette_predictor_run != 1 ) { | |
| if( palette_predictor_run > 1 ) | |
| predictorEntryIdx += palette_predictor_run − 1 | |
| PalettePredictorEntryReuseFlags[ predictorEntryIdx ] = 1 | |
| NumPredictedPaletteEntries++ | |
| } else | |
| palettePredictionFinished = 1 | |
| } | |
| 902 if( NumPredictedPaletteEntries < 31 *&& !localDualtree* ) | |
| **num_signalled_palette_entries** | ae(v) |
| for( cIdx = startComp; cIdx < ( startComp + numComps); cIdx++ ) | |
| for( i = 0; i < num_signalled_palette_entries; i++ ) | |
| **new_palette_entries**[ cIdx ][ i ] | ae(v) |
| if( CurrentPaletteSize[ startComp ] > 0 ) | |
| **palette_escape_val_present_flag** | ae(v) |
| … | |

FIG. 9

Table 3: Exemplary palette coding syntax table for applying palette mode to a CU <Part II>

| | | |
|---|---|---|
| | if( palette_escape_val_present_flag ) { | |
| | for( cIdx = startComp; cIdx < ( startComp + numComps ); cIdx++ ) | |
| | for( sPos = minSubPos; sPos < maxSubPos; sPos++ ) { | |
| | xC = x0 + TraverseScanOrder[ log2CbWidth][ log2CbHeight ][ sPos ][ 0 ] | |
| | yC = y0 + TraverseScanOrder[ log2CbWidth][ log2CbHeight ][ sPos ][ 1 ] | |
| 903 | *if( !( treeType = = SINGLE_TREE && cIdx != 0 && **(xC % SubWidthC != 0** <br> \| \| **yC % SubHeightC != 0)** ) ) {* | |
| | if( PaletteIndexMap[ cIdx ][ xC ][ yC ] = = MaxPaletteIndex ) { | |
| | **palette_escape_val** | ae(v) |
| | PaletteEscapeVal[ cIdx ][ xC ][ yC ] = palette_escape_val | |
| | } | |
| 904 | *}* | |
| | } | |
| | } | |
| | } | |
| | } | |

FIG. 9 (continued)

8.4.5.3 Decoding process for palette mode

Inputs to this process are:
- a location ( xCbComp, yCbComp ) specifying the top-left sample of the current coding block relative to the top-left sample of the current picture,
- a variable treeType specifying whether a single or a dual tree is used and if a dual tree is used, it specifies whether the current tree corresponds to the luma or chroma components,
- a variable cIdx specifying the colour component of the current block,
- two variables nCbW and nCbH specifying the width and height of the current coding block, respectively.

Output of this process is an array recSamples[ x ][ y ], with x = 0.. nCbW − 1, y = 0.. nCbH − 1 specifying reconstructed sample values for the block.
(The following is the process of pixel reconstruction)
Depending on the value of treeType, the variables startComp and numComps are derived as follows:
- If treeType is equal to SINGLE_TREE:
  startComp = 0 (444)
  numComps = 3 (445)
- Otherwise, treeType is equal to DUAL_TREE_LUMA:
  startComp = 0 (446)
  numComps = 1 (447)
- Otherwise, treeType is equal to DUAL_TREE_CHROMA:
  startComp = 1 (448)
  numComps = 2 (449)

Depending on the value of cIdx, the variables nSubWidth and nSubHeight are derived as follows:
- If cIdx is greater than 0 and startComp is equal to 0, nSubWidth is set to SubWidthC and nSubHeight is set to SubHeightC.
- Otherwise, nSubWidth is set to 1 and nSubHeight is set to 1.

The ( nCbW x nCbH ) block of the reconstructed sample array recSamples at location ( xCbComp, yCbComp ) is represented by recSamples[ x ][ y ] with x = 0..nCTbW − 1 and y = 0..nCbH − 1, and the value of recSamples[ x ][ y ] for each x in the range of 0 to nCbW − 1, inclusive, and each y in the range of 0 to nCbH − 1, inclusive, is derived as follows:
- The variables xL, yL, xCbL, and yCbL are derived as follows:
  xL = x * nSubWidth (450)
  yL = y * nSubHeight (451)
  xCbL = xCbComp * nSubWidth (452)
  yCbL = yCbComp * nSubHeight (453)
- The variable bIsEscapeSample is derived as follows:
  - If PaletteIndexMap[ xCbL + xL ][ yCbL + yL ] is equal to MaxPaletteIndex and palette_escape_val_present_flag is equal to 1, bIsEscapeSample is set equal to 1.
  - Otherwise, bIsEscapeSample is set equal to 0.
- If bIsEscapeSample is equal to 0, the following applies:
  recSamples[ x ][ y ] =
CurrentPaletteEntries[ cIdx ][ PaletteIndexMap[ xCbL + xL ][ yCbL + yL ] ] (454)
- Otherwise (bIsEscapeSample is equal to 1), the following ordered steps apply:

FIG. 10

1. The quantization parameter qP is derived as follows:
   - If cIdx is equal to 0,
     qP = Max( QpPrimeTsMin, Qp′Y ) (455)
   - Otherwise, if cIdx is equal to 1,
     qP = Max( QpPrimeTsMin, Qp′Cb ) (456)
   - Otherwise (cIdx is equal to 2),
     qP = Max( QpPrimeTsMin, Qp′Cr ) (457)
2. The list levelScale[ ] is specified as levelScale[ k ] = { 40, 45, 51, 57, 64, 72 } with k = 0..5.
3. The following applies:
   tmpVal = ( PaletteEscapeVal[ cIdx ][ xCbL + xL ][ yCbL + yL ] *
   levelScale[ qP%6 ] ) << ( qP / 6 ) + 32 ) >> 6 (458)
   recSamples[ x ][ y ] = Clip3( 0, ( 1 << BitDepth ) − 1, tmpVal ) (459)

(The following is the exemplary process for palette predictor update)

1001 *The variable localDualtree is derived as follows:*
*localDualtree = treeType != SINGLE_TREE && ( slice_type != I | | ( slice_type = = I && qtbtt_dual_tree_intra_flag = = 0 ) ) ? 1 : 0*

When one of the following conditions is true:
- cIdx is equal to 0 and numComps is equal to 1;
- cIdx is equal to 2;

the value PredictorPaletteSize[ startComp ] and the array PredictorPaletteEntries are derived or modified as follows:

1002 *If localDualtree is equal to 1, the following applies:*
- *CurrentPaletteSize[ 0 ] = CurrentPaletteSize[ startComp ]*
- *startComp = 0*
- *numComps = 3*

*The array PredictorPaletteEntries are derived or modified as follows:*

```
for( i = 0; i < CurrentPaletteSize[ startComp ]; i++ )
  for( compIdx = startComp; compIdx < (startComp + numComps); compIdx++ )
    newPredictorPaletteEntries[ compIdx ][ i ] = CurrentPaletteEntries[ compIdx ][ i ]
newPredictorPaletteSize = CurrentPaletteSize[ startComp ]
for( i = 0; i < PredictorPaletteSize[ startComp ]  &&  newPredictorPaletteSize < 63; i++ )
  if( !PalettePredictorEntryReuseFlags[ i ] ) {
    for( compIdx = startComp; compIdx < (startComp + numComps); compIdx++ )         (460)
      newPredictorPaletteEntries[ compIdx ][ newPredictorPaletteSize ] =
        PredictorPaletteEntries[ compIdx ][ i ]
    newPredictorPaletteSize++
  }
for( compIdx = startComp; compIdx < ( startComp + numComps ); compIdx++ )
  for( i = 0; i < newPredictorPaletteSize; i++ )
    PredictorPaletteEntries[ compIdx ][ i ] = newPredictorPaletteEntries[ compIdx ][ i ]
PredictorPaletteSize[ startComp ] = newPredictorPaletteSize
```

1003 *If qtbtt_dual_tree_intra_flag is equal to 0 or slice_type is not equal to I, the following applies:*
*PredictorPaletteSize[ 1 ] = newPredictorPaletteSize*

FIG. 10 (continued)

Table 4: Exemplary palette coding syntax table for applying palette mode to a CU

| | palette_coding( x0, y0, cbWidth, cbHeight, treeType ) { | **Descriptor** |
|---|---|---|
| | … | |
| | if( palette_escape_val_present_flag ) { | |
| | for( cIdx = startComp; cIdx < ( startComp + numComps ); cIdx++ ) | |
| | for( sPos = minSubPos; sPos < maxSubPos; sPos++ ) { | |
| | xC = x0 + TraverseScanOrder[ log2CbWidth][ log2CbHeight ][ sPos ][ 0 ] | |
| | yC = y0 + TraverseScanOrder[ log2CbWidth][ log2CbHeight ][ sPos ][ 1 ] | |
| 1101 | *if( !( treeType = = SINGLE_TREE && cIdx != 0 &&* ***(xC % SubWidthC != 0*** *\|\|* ***yC % SubHeightC != 0)*** *) ) {* | |
| | if( PaletteIndexMap[ cIdx ][ xC ][ yC ] = = MaxPaletteIndex ) { | |
| | **palette_escape_val** | ae(v) |
| | PaletteEscapeVal[ cIdx ][ xC ][ yC ] = palette_escape_val | |
| | } | |
| 1102 | *}* | |
| | … | |
| | palette_coding( x0, y0, cbWidth, cbHeight, treeType ) { | **Descriptor** |
| | startComp = ( treeType = = DUAL_TREE_CHROMA ) ? 1 : 0 | |

FIG. 11

7.4.12.6 Palette coding semantics new_palette_entries[ cIdx ][ i ] specifies the value for the i-th signalled palette entry for the colour component cIdx.

1201

*The variable LocalDualTreeFlag is derived as follows:*

```
LocalDualTreeFlag = ( treeType != SINGLE_TREE &&
        ( sh_slice_type != I || ( sh_slice_type = = I && sps_qtbtt_dual_tree_intra_flag = = 0 ) ) ) ? 1 : 0
```

The variable PredictorPaletteEntries[ cIdx ][ i ] specifies the i-th element in the predictor palette for the colour component cIdx.

The variable CurrentPaletteEntries[ cIdx ][ i ] specifies the i-th element in the current palette for the colour component cIdx and is derived as follows:

```
numPredictedPaletteEntries = 0
for( i = 0; i < PredictorPaletteSize[ startComp ]; i++ )
    if( PalettePredictorEntryReuseFlags[ i ] ) {
        for( cIdx = LocalDualTreeFlag ? 0 : startComp; cIdx < LocalDualTreeFlag ? 3 :      (1202)
                ( startComp + numComps ); cIdx++ )
            CurrentPaletteEntries[ cIdx ][ numPredictedPaletteEntries ] = PredictorPaletteEntries[ cIdx ][ i ]
        numPredictedPaletteEntries++
    }
for( cIdx = startComp; cIdx < (startComp + numComps); cIdx++)
    for( i = 0; i < num_signalled_palette_entries; i++ )
        CurrentPaletteEntries[ cIdx ][ numPredictedPaletteEntries + i ] = new_palette_entries[ cIdx ][ i ]
```

FIG. 12

8.4.5.3 Decoding process for palette mode

*When LocalDualTreeFlag is equal to 1, the following applies:*

- *When treeType is equal to DUAL_TREE_LUMA, the following applies for i = 0..num_signalled_palette_entries − 1:*

```
CurrentPaletteEntries[ 1 ][ NumPredictedPaletteEntries + i ] = 1 << ( BitDepth − 1 )
CurrentPaletteEntries[ 2 ][ NumPredictedPaletteEntries + i ] = 1 << ( BitDepth − 1 )
```

- *Otherwise, if treeType is equal to DUAL_TREE_CHROMA*

1203
```
for( i = 0; i < num_signalled_palette_entries[ startComp ]; i++ ) {
    CurrentPaletteEntries[ 0 ][ NumPredictedPaletteEntries + i ] = 1 << ( BitDepth − 1 )
}
```

- *The variables CurrentPaletteSize[ 0 ], startComp, numComps and maxNumPalettePredictorSize are derived as follows:*

```
CurrentPaletteSize[ 0 ] = CurrentPaletteSize[ startComp ]
startComp = 0
numComps = 3
maxNumPalettePredictorSize = 63
```

When one of the following conditions is true:

- cIdx is equal to 0 and numComps is equal to 1;

1204
- *cIdx is equal to 0 and LocalDualTreeFlag is equal to 1;*
- cIdx is equal to 2 *and LocalDualTreeFlag is equal to 0;* the value PredictorPaletteSize[ startComp ] and the array PredictorPaletteEntries are derived or modified as follows:

```
for( i = 0; i < CurrentPaletteSize[ startComp ]; i++ )
   for( compIdx = startComp; compIdx < (startComp + numComps); compIdx++ )
      newPredictorPaletteEntries[ compIdx ][ i ] = CurrentPaletteEntries[ compIdx ][ i ]
newPredictorPaletteSize = CurrentPaletteSize[ startComp ]
for( i = 0; i < PredictorPaletteSize[ startComp ]  &&  newPredictorPaletteSize < 63; i++ )
   if( !PalettePredictorEntryReuseFlags[ i ] ) {
      for( compIdx = startComp; compIdx < (startComp + numComps); compIdx++ )
         newPredictorPaletteEntries[ compIdx ][ newPredictorPaletteSize ] =
            PredictorPaletteEntries[ compIdx ][ i ]
      newPredictorPaletteSize++
   }
for( compIdx = startComp; compIdx < ( startComp + numComps ); compIdx++ )
   for( i = 0; i < newPredictorPaletteSize; i++ )
      PredictorPaletteEntries[ compIdx ][ i ] = newPredictorPaletteEntries[ compIdx ][ i ]
PredictorPaletteSize[ startComp ] = newPredictorPaletteSize
```

1205 *If qtbtt_dual_tree_intra_flag is equal to 0 or slice_type is not equal to I, the following applies:*

*PredictorPaletteSize[ 1 ] = newPredictorPaletteSize*

FIG. 12 (continued)

Table 5: Exemplary palette coding syntax table for applying palette mode to a CU

| | |
|---|---|
| palette_coding( x0, y0, cbWidth, cbHeight, treeType ) { | **Descriptor** |
| … | |
| if( palette_escape_val_present_flag ) { | |
| for( cIdx = startComp; cIdx < ( startComp + numComps ); cIdx++ ) | |
| for( sPos = minSubPos; sPos < maxSubPos; sPos++ ) { | |
| xC = x0 + TraverseScanOrder[ log2CbWidth][ log2CbHeight ][ sPos ][ 0 ] | |
| yC = y0 + TraverseScanOrder[ log2CbWidth][ log2CbHeight ][ sPos ][ 1 ] | |
| 1301 *if( !( treeType = = SINGLE_TREE && cIdx != 0 &&* ***(xC % SubWidthC != 0*** <br> *\|\|* ***yC % SubHeightC != 0)*** *) ) {* | |
| if( PaletteIndexMap[ cIdx ][ xC ][ yC ] = = MaxPaletteIndex ) { | |
| **palette_escape_val** | ae(v) |
| PaletteEscapeVal[ cIdx ][ xC ][ yC ] = palette_escape_val | |
| } | |
| 1302 *}* | |
| … | |
| palette_coding( x0, y0, cbWidth, cbHeight, treeType ) { | **Descriptor** |
| … | |

FIG. 13

8.4.5.3 Decoding process for palette mode

*The variable localDualtree is derived as follows:*

1401 *localDualtree = treeType != SINGLE_TREE && ( slice_type != I | | ( slice_type = = I && qtbtt_dual_tree_intra_flag = = 0 ) ) ? 1 : 0*

When one of the following conditions is true *and localDualtree is equal to 0*:

- cIdx is equal to 0 and numComps is equal to 1;
- cIdx is equal to 2;

the value PredictorPaletteSize[ startComp ] and the array PredictorPaletteEntries are derived or modified as follows:

```
for( i = 0; i < CurrentPaletteSize[ startComp ]; i++ )
   for( compIdx = startComp; compIdx < (startComp + numComps); compIdx++ )
         newPredictorPaletteEntries[ compIdx ][ i ] = CurrentPaletteEntries[ compIdx ][ i ]
newPredictorPaletteSize = CurrentPaletteSize[ startComp ]
for( i = 0; i < PredictorPaletteSize[ startComp ]  &&  newPredictorPaletteSize < 63; i++ )
   if( !PalettePredictorEntryReuseFlags[ i ] ) {
         for( compIdx = startComp; compIdx < (startComp + numComps); compIdx++ )          (460)
               newPredictorPaletteEntries[ compIdx ][ newPredictorPaletteSize ] =
                     PredictorPaletteEntries[ compIdx ][ i ]
         newPredictorPaletteSize++
   }
for( compIdx = startComp; compIdx < ( startComp + numComps ); compIdx++ )
   for( i = 0; i < newPredictorPaletteSize; i++ )
         PredictorPaletteEntries[ compIdx ][ i ] = newPredictorPaletteEntries[ compIdx ][ i ]
PredictorPaletteSize[ startComp ] = newPredictorPaletteSize
```

*If qtbtt_dual_tree_intra_flag is equal to 0 or slice_type is not equal to I, the following applies:*

1402 *PredictorPaletteSize[ 1 ] = newPredictorPaletteSize*

FIG. 14

Table 6: Exemplary coding unit syntax table

| coding_unit( x0, y0, cbWidth, cbHeight, cqtDepth, treeType, modeType ) { | **Descriptor** |
|---|---|
| if( sh_slice_type = = I && ( cbWidth > 64 \|\| cbHeight > 64 ) ) | |
| modeType = MODE_TYPE_INTRA | |
| chType = treeType = = DUAL_TREE_CHROMA ? 1 : 0 | |
| if( sh_slice_type != I \|\| sps_ibc_enabled_flag ) { | |
| if( treeType != DUAL_TREE_CHROMA && ( ( !( cbWidth = = 4 && cbHeight = = 4 ) && modeType != MODE_TYPE_INTRA ) \|\| ( sps_ibc_enabled_flag && cbWidth <= 64 && cbHeight <= 64 ) ) ) | |
| **cu_skip_flag**[ x0 ][ y0 ] | ae(v) |
| if( cu_skip_flag[ x0 ][ y0 ] = = 0 && sh_slice_type != I && !( cbWidth = = 4 && cbHeight = = 4 ) && modeType = = MODE_TYPE_ALL ) | |
| **pred_mode_flag** | ae(v) |
| if( ( ( sh_slice_type = = I && cu_skip_flag[ x0 ][ y0 ] = =0 ) \|\| ( sh_slice_type != I && ( CuPredMode[ chType ][ x0 ][ y0 ] != MODE_INTRA \|\| ( ( ( cbWidth = = 4 && cbHeight = = 4 ) \|\| modeType = = MODE_TYPE_INTRA ) && cu_skip_flag[ x0 ][ y0 ] = = 0 ) ) ) ) && cbWidth <= 64 && cbHeight <= 64 && modeType != MODE_TYPE_INTER && (1501) sps_ibc_enabled_flag *&& treeType != DUAL_TREE_CHROMA* ) | |
| **pred_mode_ibc_flag** | ae(v) |
| } | |
| … | |

FIG. 15

Table 7: Exemplary palette coding syntax table

| | palette_coding( x0, y0, cbWidth, cbHeight, treeType ) { | **Descriptor** |
|---|---|---|
| | … | |
| | if( palette_escape_val_present_flag ) { | |
| | for( cIdx = startComp; cIdx < ( startComp + numComps ); cIdx++ ) | |
| | for( sPos = minSubPos; sPos < maxSubPos; sPos++ ) { | |
| | xC = x0 + TraverseScanOrder[ log2CbWidth][ log2CbHeight ][ sPos ][ 0 ] | |
| | yC = y0 + TraverseScanOrder[ log2CbWidth][ log2CbHeight ][ sPos ][ 1 ] | |
| 1601 | *if( !( treeType = = SINGLE_TREE && cIdx != 0 &&* ***(xC % SubWidthC != 0*** *\|\|* ***yC % SubHeightC != 0)*** *) ) {* | |
| | if( PaletteIndexMap[ cIdx ][ xC ][ yC ] = = MaxPaletteIndex ) { | |
| | **palette_escape_val** | ae(v) |
| | PaletteEscapeVal[ cIdx ][ xC ][ yC ] = palette_escape_val | |
| | } | |
| 1602 | *}* | |
| | } | |

FIG. 16

7.4.12.6 Palette coding semantics new_palette_entries[ cIdx ][ i ] specifies the value for the i-th signalled palette entry for the colour component cIdx.

1701

*The variable LocalDualTreeFlag is derived as follows:*

```
LocalDualTreeFlag = ( treeType != SINGLE_TREE &&
        ( sh_slice_type != I | | ( sh_slice_type = = I && sps_qtbtt_dual_tree_intra_flag = = 0 ) ) ) ? 1 : 0
```

The variable PredictorPaletteEntries[ cIdx ][ i ] specifies the i-th element in the predictor palette for the colour component cIdx.

The variable CurrentPaletteEntries[ cIdx ][ i ] specifies the i-th element in the current palette for the colour component cIdx and is derived as follows:

```
numPredictedPaletteEntries = 0
for( i = 0; i < PredictorPaletteSize[ startComp ]; i++ )
    if( PalettePredictorEntryReuseFlags[ i ] ) {
        for( cIdx = LocalDualTreeFlag ? 0 : startComp; cIdx < LocalDualTreeFlag ? 3 :      (1702)
                ( startComp + numComps ); cIdx++ )
            CurrentPaletteEntries[ cIdx ][ numPredictedPaletteEntries ] = PredictorPaletteEntries[ cIdx ][ i ]
        numPredictedPaletteEntries++
    }
for( cIdx = startComp; cIdx < (startComp + numComps); cIdx++)
    for( i = 0; i < num_signalled_palette_entries; i++ )
        CurrentPaletteEntries[ cIdx ][ numPredictedPaletteEntries + i ] = new_palette_entries[ cIdx ][ i ]
```

FIG. 17

8.4.5.3 Decoding process for palette mode

...

*When LocalDualTreeFlag is equal to 1, the following applies:*

- *When treeType is equal to DUAL_TREE_LUMA, the following applies for i = 0..num_signalled_palette_entries − 1:*

*CurrentPaletteEntries[ 1 ][ NumPredictedPaletteEntries + i ] = 1 << ( BitDepth − 1 )*

*CurrentPaletteEntries[ 2 ][ NumPredictedPaletteEntries + i ] = 1 << ( BitDepth − 1 )*

1703 – *The variables CurrentPaletteSize[ 0 ], startComp, numComps and maxNumPalettePredictorSize are derived as follows:*

*CurrentPaletteSize[ 0 ] = CurrentPaletteSize[ startComp ]*

*startComp = 0*

*numComps = 3*

*maxNumPalettePredictorSize = 63*

When one of the following conditions is true:

– cIdx is equal to 0 and numComps is equal to 1;

1704 – *cIdx is equal to 0 and LocalDualTreeFlag is equal to 1;*

– cIdx is equal to 2 *and LocalDualTreeFlag is equal to 0;* the value PredictorPaletteSize[ startComp ] and the array PredictorPaletteEntries are derived or modified as follows:

```
for( i = 0; i < CurrentPaletteSize[ startComp ]; i++ )
   for( compIdx = startComp; compIdx < (startComp + numComps); compIdx++ )
        newPredictorPaletteEntries[ compIdx ][ i ] = CurrentPaletteEntries[ compIdx ][ i ]
newPredictorPaletteSize = CurrentPaletteSize[ startComp ]
for( i = 0; i < PredictorPaletteSize[ startComp ]  &&  newPredictorPaletteSize < 63; i++ )
   if( !PalettePredictorEntryReuseFlags[ i ] ) {
        for( compIdx = startComp; compIdx < (startComp + numComps); compIdx++ )
              newPredictorPaletteEntries[ compIdx ][ newPredictorPaletteSize ] =
                  PredictorPaletteEntries[ compIdx ][ i ]
        newPredictorPaletteSize++
   }
for( compIdx = startComp; compIdx < ( startComp + numComps ); compIdx++ )
   for( i = 0; i < newPredictorPaletteSize; i++ )
        PredictorPaletteEntries[ compIdx ][ i ] = newPredictorPaletteEntries[ compIdx ][ i ]
PredictorPaletteSize[ startComp ] = newPredictorPaletteSize
```

1705 *If qtbtt_dual_tree_intra_flag is equal to 0 or slice_type is not equal to I, the following applies:*

*PredictorPaletteSize[ 1 ] = newPredictorPaletteSize*

FIG. 17 (continued)

VIDEO PROCESSING METHOD AND APPARATUS FOR USING PALETTE MODE

CROSS-REFERENCE TO RELATED APPLICATIONS

This application is a continuation of U.S. application Ser. No. 17/062,135, filed on Oct. 2, 2020, which claims priority to U.S. Provisional Application No. 62/943,083, filed on Dec. 3, 2019, and U.S. Provisional Application No. 62/952,426, filed on Dec. 22, 2019, all of which are incorporated herein by reference in their entireties.

TECHNICAL FIELD

The present disclosure generally relates to video processing, and more particularly, to methods and apparatuses for signaling and using a palette mode.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

The embodiments of the present disclosure provide a method and device for signaling and using a palette mode. In some exemplary embodiments, a video processing method includes: receiving a first palette entry for palette coding a target coding unit (CU); determining whether the target CU is part of a single-tree slice; determining whether the target CU is coded with separate luma and chroma trees; and in response to the target CU being determined to be part of a single-tree slice and be coded with separate luma and chroma trees, decoding a first component of the target CU based on the first palette entry, and decoding a second component of the target CU based on a default palette entry.

In some embodiments, an exemplary video processing apparatus includes at least one memory for storing instructions and at least one processor. The at least one processor is configured to execute the instructions to cause the apparatus to perform: receiving a first palette entry for palette coding a target coding unit (CU); determining whether the target CU is part of a single-tree slice; determining whether the target CU is coded with separate luma and chroma trees; and in response to the target CU being determined to be part of a single-tree slice and be coded with separate luma and chroma trees, decoding a first component of the target CU based on the first palette entry, and decoding a second component of the target CU based on a default palette entry.

In some embodiments, an exemplary non-transitory computer readable storage medium stores a set of instructions. The set of instructions are executable by one or more processing devices to cause a video processing apparatus to perform: receiving a first palette entry for palette coding a target coding unit (CU); determining whether the target CU is part of a single-tree slice; determining whether the target CU is coded with separate luma and chroma trees; and in response to the target CU being determined to be part of a single-tree slice and be coded with separate luma and chroma trees, decoding a first component of the target CU based on the first palette entry, and decoding a second component of the target CU based on a default palette entry.

BRIEF DESCRIPTION OF THE DRAWINGS

Embodiments and various aspects of the present disclosure are illustrated in the following detailed description and the accompanying figures. Various features shown in the figures are not drawn to scale.

FIG. 7 illustrates an exemplary Table 1 showing a part of sequence parameter set (SPS) syntax table, according to some embodiments of the present disclosure.

FIG. 8 illustrates an exemplary Table 2 showing a part of coding unit syntax table, according to some embodiments of the present disclosure.

FIG. 9 illustrates an exemplary Table 3 showing a part of palette coding syntax table, according to some embodiments of the present disclosure.

FIG. 10 illustrates an exemplary decoding process for palette mode, according to some embodiments of the present disclosure.

FIG. 11 illustrates an exemplary Table 4 showing a part of palette coding syntax table, according to some embodiments of the present disclosure.

FIG. 12 illustrates an exemplary palette coding semantics and decoding process for palette mode, according to some embodiments of the present disclosure.

FIG. 13 illustrates an exemplary Table 5 showing a part of the palette coding syntax table, according to some embodiments of the present disclosure.

FIG. 14 illustrates an exemplary decoding process for palette mode, according to some embodiments of the present disclosure.

FIG. 15 illustrates an exemplary Table 6 showing a part of the coding unit syntax table, according to some embodiments of the present disclosure.

FIG. 16 illustrates an exemplary Table 7 showing a part of the palette coding syntax table, according to some embodiments of the present disclosure.

FIG. 17 illustrates another exemplary palette coding semantics and decoding process for palette mode, according to some embodiments of the present disclosure.

DETAILED DESCRIPTION

Figure 1:
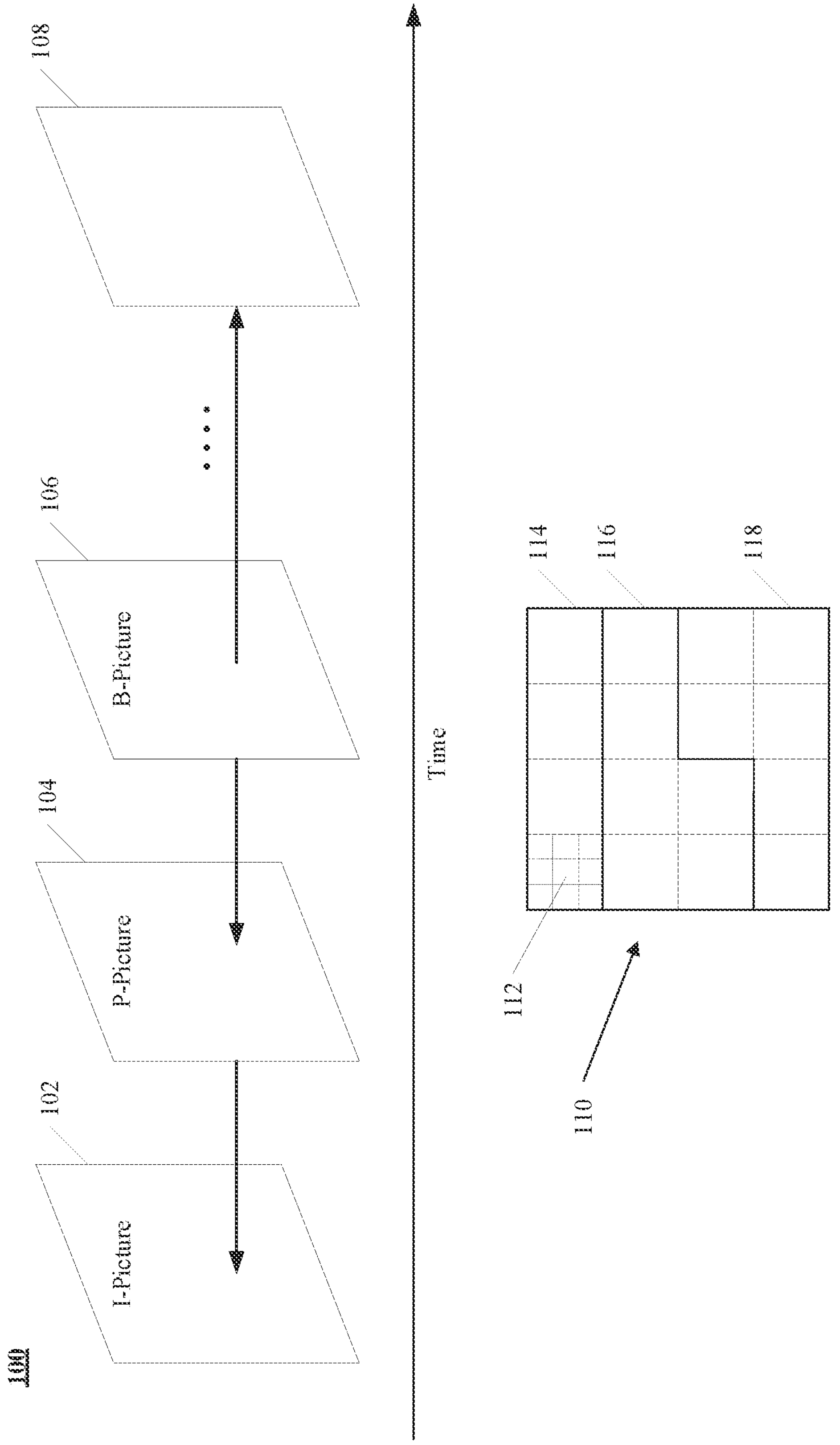
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

In order to achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC. The VCEG and MPEG have formally started the development of next generation video compression standard beyond HEVC.

The VVC standard has been developed recent, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Figure 2:
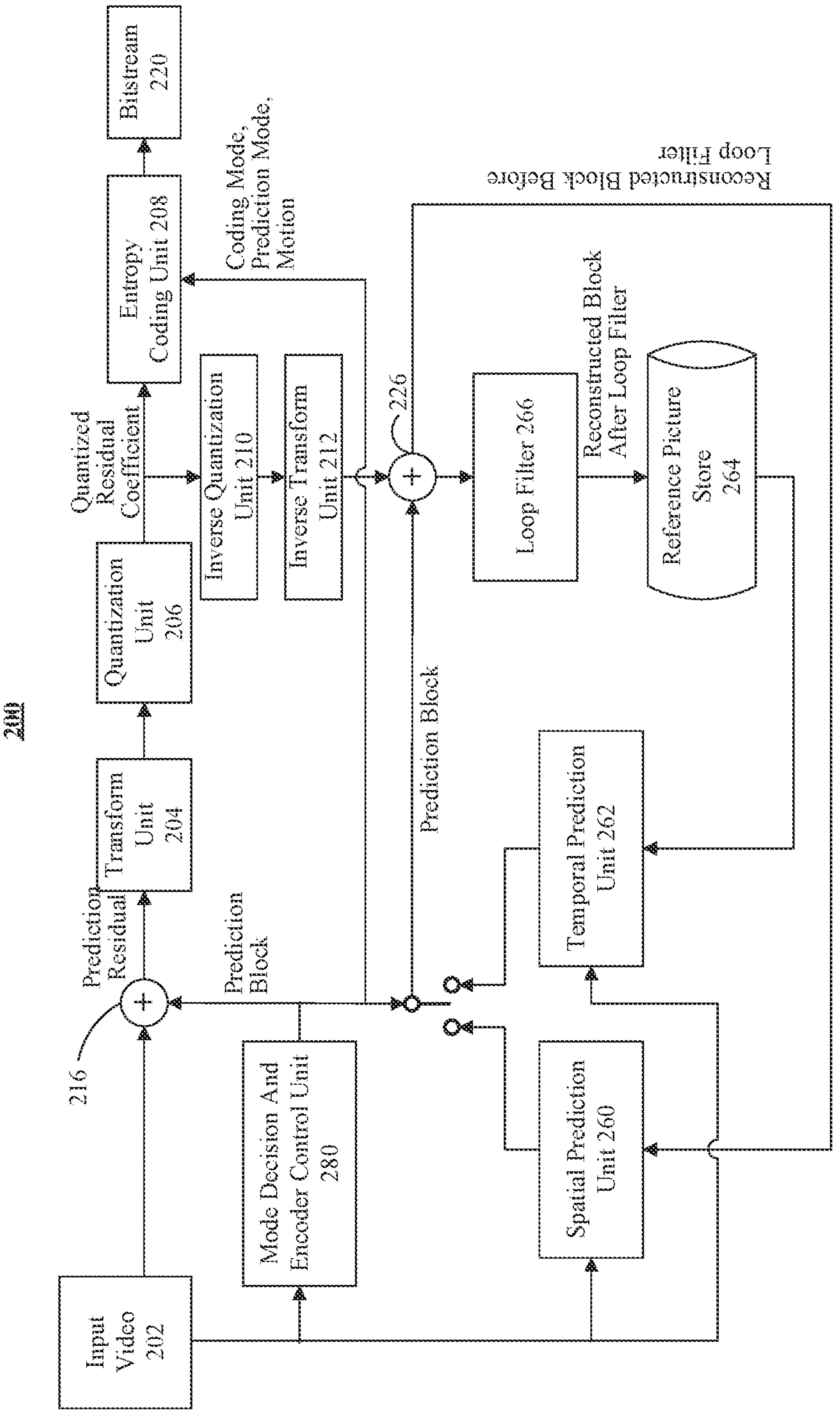
FIG. 2 illustrates a schematic diagram of an exemplary encoder in a hybrid video coding system, according to some embodiments of the present disclosure.
Figure 3:
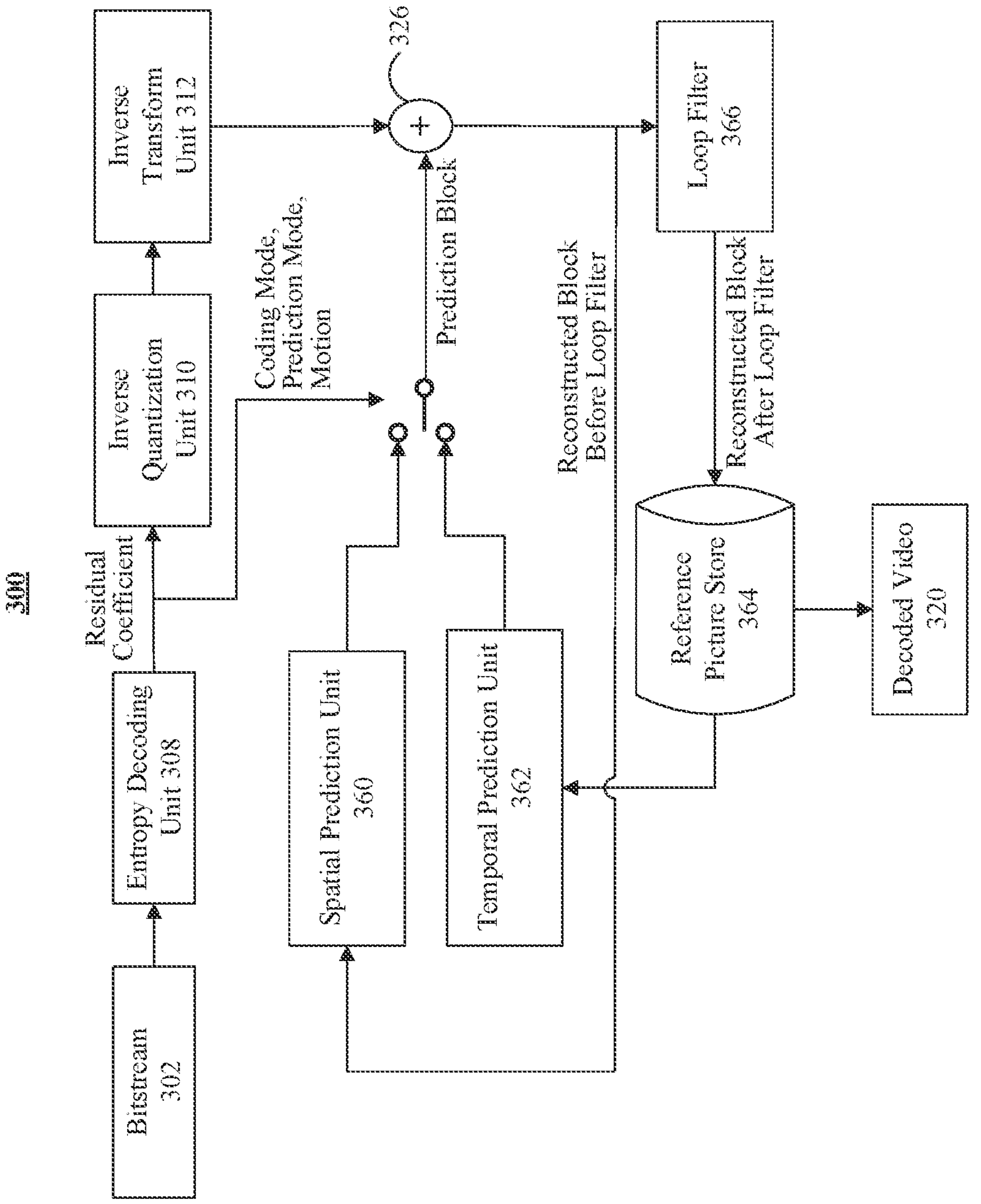
FIG. 3 illustrates a schematic diagram of an exemplary decoder in a hybrid video coding system, according to some embodiments of the present disclosure.

Video coding has multiple stages of operations, examples of which are shown in FIG. 2 and FIG. 3. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

For example, at a mode decision stage (an example of which is shown in FIG. 2), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIG. 2), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIG. 2), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2 illustrates a schematic diagram of an exemplary encoder 200 in a hybrid video coding system, according to some embodiments of the present disclosure. Video encoder 200 may perform intra- or inter-coding of blocks within video frames, including video blocks, or partitions or sub-partitions of video blocks. Intra-coding may rely on spatial prediction to reduce or remove spatial redundancy in video within a given video frame. Inter-coding may rely on temporal prediction to reduce or remove temporal redundancy in video within adjacent frames of a video sequence. Intra modes may refer to a number of spatial based compression modes. Inter modes (such as uni-prediction or bi-prediction) may refer to a number of temporal-based compression modes.

Referring to FIG. 2, input video signal 202 may be processed block by block. For example, the video block unit may be a 16×16 pixel block (e.g., a macroblock (MB)). The size of the video block units may vary, depending on the coding techniques used, and the required accuracy and efficiency. In HEVC, extended block sizes (e.g., a coding tree unit (CTU)) may be used to compress video signals of resolution, e.g., 1080p and beyond. In HEVC, a CTU may include up to 64×64 luma samples corresponding chroma samples, and associated syntax elements. In VVC, the size of a CTU may be further increased to include 128×128 luma samples, corresponding chroma samples, and associated syntax elements. A CTU can be further divided into coding units (CUs) using, for example, quad-tree, binary tree, or ternary tree. A CU may be further partitioned into prediction units (PUs), for which separate prediction methods may be applied. Each input video block may be processed by using spatial prediction unit 260 or temporal prediction unit 262.

Spatial prediction unit 260 performs spatial prediction (e.g., intra prediction) to the current block/CU using information on the same picture/slice containing the current block. Spatial prediction may use pixels from the already coded neighboring blocks in the same video picture frame/slice to predict the current video block. Spatial prediction may reduce spatial redundancy inherent in the video signal.

Temporal prediction unit 262 performs temporal prediction (e.g., inter prediction) to the current block using information from picture(s)/slice(s) different from the picture/slice containing the current block. Temporal prediction for a video block may be signaled by one or more motion vectors. In unit-directional temporal prediction, only one motion vector indicating one reference picture is used to generate the prediction signal for the current block. On the other hand, in bi-directional temporal prediction, two motion vectors, each indicating a respective reference picture, can be used to generate the prediction signal for the current block. The motion vectors may indicate the amount and the direction of motion between the current block and one or more associated block(s) in the reference frames. If multiple reference pictures are supported, one or more reference picture indices may be sent for a video block. The one or more reference indices may be used to identify from which reference picture(s) in the reference picture store or decoded picture buffer (DPB) 264, the temporal prediction signal may come.

Mode decision and encoder control unit 280 in the encoder may choose the prediction mode, for example, based on rate-distortion optimization. Based on the determined prediction mode, the prediction block can be obtained. The prediction block may be subtracted from the current video block at adder 216. The prediction residual may be transformed by transformation unit 204 and quantized by quantization unit 206. The quantized residual coefficients may be inverse quantized at inverse quantization unit 210 and inverse transformed at inverse transform unit 212 to form the reconstructed residual. The reconstructed residual may be added to the prediction block at adder 226 to form the reconstructed video block. The reconstructed video block before loop-filtering may be used to provide reference samples for intra prediction.

The reconstructed video block may go through loop filtering at loop filter 266. For example, loop filtering such as deblocking filter, sample adaptive offset (SAO), and adaptive loop filter (ALF) may be applied. The reconstructed block after loop filtering may be stored in reference picture store 264 and can be used to provide inter prediction reference samples for coding other video blocks. To form the output video bitstream 220, coding mode (e.g., inter or intra), prediction mode information, motion information, and quantized residual coefficients may be sent to the entropy coding unit 208 to further reduce the bit rate, before the data are compressed and packed to form bitstream 220.

FIG. 3 illustrates a schematic diagram of an exemplary decoder 300 in a hybrid video coding system, according to some embodiments of the present disclosure. Referring to FIG. 3, a video bitstream 302 may be unpacked or entropy decoded at entropy decoding unit 308. The coding mode information can be used to determine whether the spatial prediction unit 360 or the temporal prediction unit 362 is to be selected. The prediction mode information can be sent to the corresponding prediction unit to generate the prediction block. For example, motion compensated prediction may be applied by the temporal prediction unit 362 to form the temporal prediction block.

The residual coefficients may be sent to inverse quantization unit 310 and inverse transform unit 312 to obtain the reconstructed residual. The prediction block and the reconstructed residual can be added together at 326 to form the reconstructed block before loop filtering. The reconstructed block may then go through loop filtering at loop filer 366. For example, loop filtering such as deblocking filter, SAO, and ALF may be applied. The reconstructed block after loop filtering can then be stored in reference picture store 364. The reconstructed data in the reference picture store 364 may be used to obtain decoded video 320, or used to predict future video blocks. Decoded video 320 may be displayed on a display device, such as a TV, a PC, a smartphone, or a tablet to be viewed by the end-users.

Figure 4:
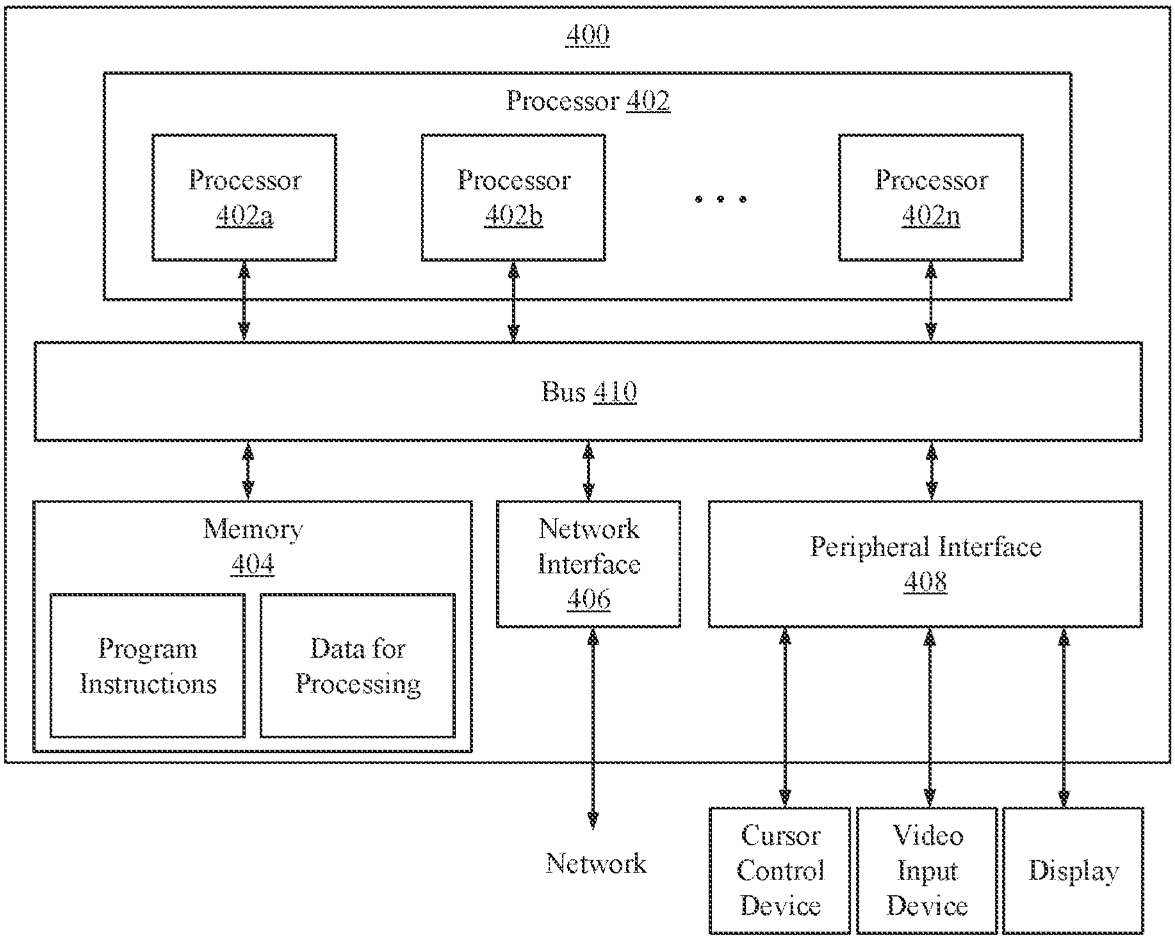
FIG. 4 illustrates a block diagram of an exemplary apparatus for encoding or decoding a video, according to some embodiments of the present disclosure.

FIG. 4 is a block diagram of an exemplary apparatus 400 for encoding or decoding a video, according to some embodiments of the present disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402*a*, processor 402*b*, and processor 402*n*.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in FIG. 2 or FIG. 3) and data for processing. Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in the present disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs can be implemented as any combination of any software or hardware modules in apparatus 400. For example, some or all stages of encoder 200 of FIG. 2 or decoder 300 of FIG. 3 can be implemented as one or more software modules of apparatus 400, such as program instructions that can be loaded into memory 404. For another example, some or all stages of encoder 200 of FIG. 2 or decoder 300 of FIG. 3 can be implemented as one or more hardware modules of apparatus 400, such as a specialized data processing circuit (e.g., an FPGA, an ASIC, an NPU, or the like).

In the quantization and inverse quantization functional blocks (e.g., quantization unit 206 and inverse quantization unit 210 of FIG. 2, inverse quantization unit 310 of FIG. 3), a quantization parameter (QP) is used to determine the amount of quantization (and inverse quantization) applied to the prediction residuals. Initial QP values used for coding of a picture or slice may be signaled at the high level, for example, using syntax element init_qp_minus26 in the Picture Parameter Set (PPS) and using syntax element slice_qp_delta in the slice header. Further, the QP values may be adapted at the local level for each CU using delta QP values sent at the granularity of quantization groups.

In VVC (e.g., VVC draft 7), palette mode is used in 4:4:4 color format. When the palette mode is enabled, a flag is transmitted at the CU level if the CU size is smaller than or equal to 64×64 indicating whether the palette mode is used.

Figure 5:
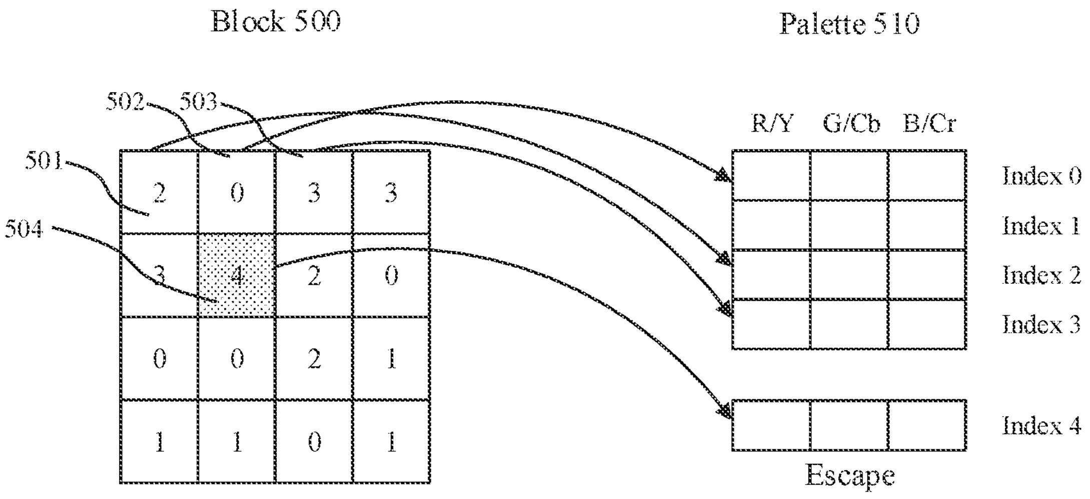
FIG. 5 illustrates a schematic diagram of an exemplary image block coded in palette mode, according to some embodiments of the present disclosure.

FIG. 5 illustrates a schematic diagram of an exemplary image block 500 coded in palette mode, according to some embodiments of the present disclosure. As shown in FIG. 5, if the palette mode is utilized to code a current CU, the sample values in each position in the CU are represented by a small set of representative color values. The set is referred to as a palette (e.g., palette 510). For sample positions (e.g., positions 501, 502, or 503) with values close to the palette colors, the corresponding palette indices (e.g., index 0, index 1, index 2, or index 3) are signaled. According to some disclosed embodiments, a color value that is outside the palette can be specified by signaling an escape index (or escape color index). Then, for all positions (e.g., position 504) in the CU that use the escape color index (e.g., index 4), the (quantized) color component values are signaled for each of these positions.

Figure 6:
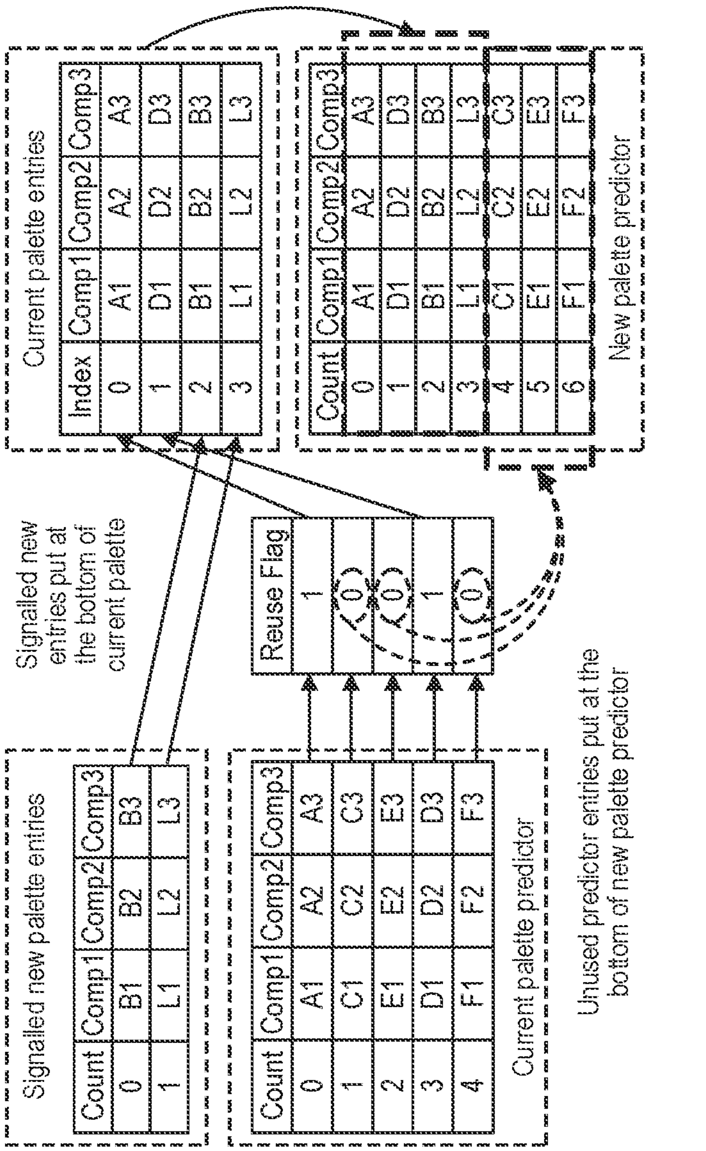
FIG. 6 illustrates a schematic diagram of an exemplary process for updating palette predictor after encoding a coding unit, according to some embodiments of the present disclosure.

For coding the palette, a palette predictor is maintained. The predictor is initialized to 0 (e.g., empty) at the beginning of each slice for non-wavefront case and at the beginning of each CTU row for wavefront case. FIG. 6 illustrates a schematic diagram of an exemplary process 600 for updating palette predictor after encoding a coding unit, according to some embodiments of the present disclosure. As shown in FIG. 6, for each entry in the palette predictor, a reuse flag is signaled to indicate whether it will be included in the current palette of the current CU. The reuse flags are sent using run-length coding of zeros, after which the number of new palette entries and the component values for the new palette entries are signaled. After encoding the palette coded CU, the palette predictor is updated using the current palette, and entries from the previous palette predictor that are not reused in the current palette are added at the end of the new palette predictor until the maximum size allowed is reached.

In some embodiments, an escape flag is signaled for each CU to indicate if escape symbols are present in the current CU. If escape symbols are present, the palette table is augmented by one and the last index (e.g., index 4 as shown in FIG. 5) is assigned to be the escape symbol.

Referring back to FIG. 5, palette indices (e.g., index 0, index 1, index 2, index 3, and index 4) of samples in a CU form a palette index map. The index map is coded using horizontal or vertical traverse scans. The scan order is explicitly signaled in the bitstream using syntax element palette_transpose_flag. The palette index map is coded using the index-run mode or the index-copy mode.

In some embodiments, the palette mode is allowed only for 4:4:4 color format. However, a large amount of video content may be coded with other color formats, e.g., the 4:2:0 chroma sub-sampling format. The present disclosure provides methods to extend the palette mode to other chroma formats such as monochrome, 4:2:0, 4:2:2, etc.

Moreover, for slices with dual luma/chroma tree, the palette is applied on luma (Y component) and chroma (Cb and Cr components) separately. For slices of single tree, the palette is applied on Y, Cb, Cr components jointly (e.g., each entry in the palette contains Y, Cb, Cr values). However, in VVC, for 4:2:0 and 4:2:2 color format, a coding unit (CU) of a single-tree slice can have separate luma and chroma trees due to the restriction on the allowable smallest chroma coding block sizes. Hence, the joint palette cannot be applied to the dual-tree CU because luma and chroma of the dual-tree CU are processed separately (although the CU belongs to a single-tree slice). Thus, in some embodiments of the present disclosure, while extending the palette mode to other chroma formats such as 4:2:0 and 4:2:2, the possibilities of a single-tree slice with a local dual-tree structure (e.g., single tree at slice level while dual tree at CU level) can be addressed.

Some embodiments of the present disclosure provide methods and apparatus for applying the palette mode to color formats other than the 4:4:4 color format (or non 4:4:4 color format), and to single-tree slice with local dual-tree structures.

Some embodiments of the present disclosure can allow the palette mode for all chroma formats, such as monochrome, 4:2:0, 4:2:2, 4:4:4, etc. FIG. 7 illustrates an exemplary Table 1 showing a part of SPS syntax table, according to some embodiments of the present disclosure. As shown in Table 1, the syntax elements that are stricken through in box 701 are proposed to be deleted from the current VVC draft 7, and the syntax elements that are italicized in box 702 are proposed to be added to the current VVC draft 7. The SPS flag sps_palette_enabled_flag can be signaled regardless of the value of syntax element chroma_format_idc.

As explained above, in the current video coding standard (for example, VVC draft 7), for slices with single tree, the palette mode is applied on Y, Cb, Cr components jointly. The P and B slices are always coded as single-tree slices. The tree structure of I slices are signaled through SPS syntax, e.g., syntax element qtbtt_dual_tree_intra_flag. Syntax element qtbtt_dual_tree_intra_flag equal to 1 specifies that for I slices, two separate coding_tree syntax structures for luma and chroma are used. Syntax element qtbtt_dual_tree_intra_flag equal to 0 specifies that separate coding_tree syntax structure is not used for I slices.

A coding unit of a single-tree slice can have separate luma and chroma trees, because in case of a non-inter smallest chroma intra prediction unit (SCIPU), chroma is not allowed to be further split, but luma is allowed to be further split. In single-tree coding, an SCIPU is defined as a coding tree node whose chroma block size is larger than or equal to 16 chroma samples and has at least one child luma block smaller than 64 luma samples. Hence, the joint palette cannot be applied to a dual-tree CU because luma and chroma of the dual-tree CU are processed separately (although the dual-tree CU belong to a single-tree slice). This presents an issue for applying the palette mode to a single-tree slice with dual-tree CUs. The present disclosure provides some embodiments to address this issue.

According to some embodiments, the palette mode is not allowed for a CU if the CU contains local dual trees. Therefore, the palette mode is not allowed for a CU if both of the following conditions are satisfied: (1) the CU is coded with separate trees, and (2) the CU belongs to a slice with single tree. FIG. 8 illustrates an exemplary Table 2 showing a part of the coding unit syntax table, according to some embodiments of the present disclosure. The coding unit syntax table of Table 2 can disallow the palette mode for a CU. As shown in Table 2, the syntax changes consistent with the present embodiments are italicized in box 801. Based on the coding unit syntax table of Table 2, the palette mode is not allowed if the following two conditions are satisfied:

(treeType!=SINGLE_TREE) &&

(slice_type!=I||qtbtt_dual_tree_intra_flag==0)

According to some embodiments, to improve the coding efficiency of palette mode, the palette mode is applied to a CU containing local dual trees. For a local dual tree block, the reuse flags (e.g. syntax element palette_predictor_run) are signaled without new palette entry (e.g. syntax element new_palette_entries[cIdx][i]) being added. Since the local dual-tree block may only contain luma (or chroma) component, the chroma (or luma) value for the new palette entry may be empty. Thus, sending new palette entry for the local dual-tree blocks is restricted. FIG. 9 illustrates an exemplary Table 3 showing a part of the palette coding syntax table, according to some embodiments of the present disclosure. The palette coding syntax table of Table 3 can apply the palette mode to a CU containing local dual trees. As shown in Table 3, the syntax changes consistent with the present embodiments are italicized in boxes 901-904.

Moreover, for non 4:4:4 color format, there are pixels only containing luma component. Therefore, in some embodiments, only luma values are signaled for these pixels when they are coded using escape mode (see syntax in Table 3 of FIG. 9 that are both bold and shaded in box 903).

FIG. 10 illustrates an exemplary decoding process for palette mode, according to some embodiments of the present disclosure. The decoding process includes the section 8.4.5.3 in VVC draft 7. Decoding process can contains two processes, one for pixel reconstruction and the other for palette predictor update.

As shown in FIG. 10, decoding process can be similar to section 8.4.5.3 in VVC draft 7. Decoding process can include some syntax changes that are italicized in boxes 1001-1003. When updating the palette predictor using the current palette, entries for the current palette are put in the front of the new palette predictor. Then, entries from the previous palette predictor that are not reused in the current palette are added at the end of the new palette predictor. For the local dual-tree blocks, each palette entry contains both luma and chroma components. Therefore, all three components are involved in the process of palette predictor update. It is a requirement of bitstream conformance that the value of PredictorPaletteSize[startComp] is in the range of 0 to 63, inclusive.

According to some embodiments, the palette mode can be applied to a local dual-tree block in the same way as the palette mode applied to a single-tree block. Because the local dual-tree block may only contain luma (or chroma) component, the value of luma (or chroma) component is signaled and a default value can be set to the chroma (or luma) component for the new palette entry. As an example, the default value may be related to the video sequence's bit depth. As another example, the default value may be zero.

Moreover, for non 4:4:4 color format, only luma values are signaled for pixels only containing luma components when they are coded using escape mode. FIG. 11 illustrates an exemplary Table 4 showing a part of the palette coding syntax table, according to some embodiments of the present disclosure. The palette coding syntax table of Table 4 can apply the palette mode to a CU containing local dual trees. As shown in Table 4, the syntax changes consistent with the present embodiments are italicized in box 1101 and box 1102.

In some embodiments of the present disclosure, the syntax parsing for the local dual tree can be aligned with that for the single tree. Moreover, the coding efficiency for palette mode can be improved because less bits are signaled.

FIG. 12 illustrates an exemplary palette coding semantics and decoding process for palette mode, according to some embodiments of the present disclosure. As shown in FIG. 12, the proposed syntax changes to the section 7.4.12.6 and the section 8.4.5.3 in VVC draft 7 are italicized in box 1201-1205. For the local dual-tree blocks, when performing the palette predictor update, a default value is first filled in the current palette (see semantics in bold in FIG. 12). Then, all three components are involved in the process of palette predictor update. It is a requirement of bitstream conformance that the value of PredictorPaletteSize[startComp] is in the range of 0 to 63, inclusive.

According to some embodiments, the palette mode can be applied to a local dual tree block in the same way as the palette mode is applied to a single-tree block, which is similar to the embodiments shown in Table 4 of FIG. 11. However, in some embodiments, the palette for the local dual-tree block is not used to update the palette predictor. Therefore, the decoding process can be simplified because the reordering process in palette predictor is skipped.

Moreover, for non 4:4:4 color format, only luma values are signaled for pixels only containing luma components when they are coded using escape mode. FIG. 13 illustrates an exemplary Table 5 showing a part of the palette coding syntax table, according to some embodiments of the present disclosure. The palette coding syntax table of Table 5 can apply the palette mode to a CU containing local dual trees. As shown in Table 5, the syntax changes consistent with the present embodiments are italicized in box 1301 and box 1302.

FIG. 14 illustrates an exemplary decoding process for palette mode, according to some embodiments of the present disclosure. As shown in FIG. 14, the proposed syntax change to the section 8.4.5.3 in VVC draft 7 are italicized in box 1401 and box 1402. For the local dual-tree blocks, the palette predictor is not updated. It is a requirement of bitstream conformance that the value of PredictorPaletteSize [startComp] is in the range of 0 to 63, inclusive.

According to some embodiments, the palette mode can be applied to a local dual-tree luma block in the same way as the palette mode applied to a single-tree block. For local dual-tree chroma block, the palette mode is disabled. Because the local dual-tree luma block may only contain luma component, the value of luma component is signaled and a default value can be set to the chroma component for the new palette entry. As an example, the default value may be related to the bit depth of the video sequence. As another example, the default value may be zero.

Moreover, for non 4:4:4 color format, only luma values are signaled for pixels only containing luma components when they are coded using escape mode. FIG. 15 illustrates an exemplary Table 6 showing a part of the coding unit syntax table, according to some embodiments of the present disclosure. FIG. 16 illustrates an exemplary Table 7 showing a part of the palette coding syntax table, according to some embodiments of the present disclosure. The palette coding syntax table can apply the palette mode to a CU containing luma local dual trees. The syntax changes in Table 6 and Table 7 consistent with the present embodiments are italicized in box 1501 and boxes 1601-1602, respectively.

In some embodiments of the present disclosure, with disabling the palette for chroma local dual tree, the palette design is simplified.

FIG. 17 illustrates an exemplary palette coding semantics and decoding process for palette mode, according to some embodiments of the present disclosure. As shown in FIG. 17, the proposed syntax changes to the section 7.4.12.6 and the section 8.4.5.3 in VVC draft 7 are italicized in boxes 1701-1705. For the local dual-tree blocks, when performing the palette predictor update, a default value is first filled in the current palette. Then, all three components are involved in the process of palette predictor update. It is a requirement of bitstream conformance that the value of PredictorPaletteSize[startComp] is in the range of 0 to 63, inclusive.

Figure 18:
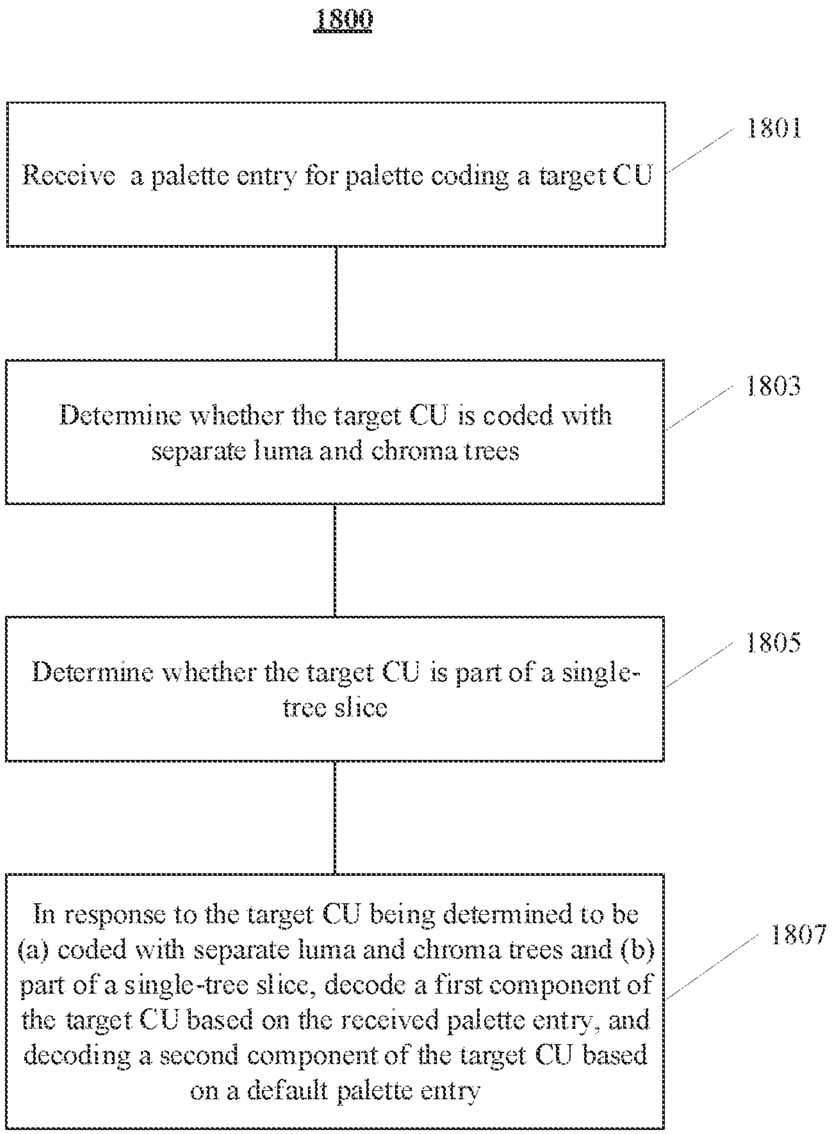
FIG. 18 illustrates a flowchart of an exemplary video processing method, according to some embodiments of the present disclosure.

FIG. 18 illustrates a flowchart of an exemplary video processing method 1800, according to some embodiments of the present disclosure. In some embodiments, method 1800 can be performed by a decoder (e.g., decoder 300 of FIG. 3) or one or more software or hardware components of an apparatus (e.g., apparatus 400 of FIG. 4). For example, a processor (e.g., processor 402 of FIG. 4) can perform method 1800. In some embodiments, method 1800 can be implemented by a computer program product, embodied in a computer-readable medium, including computer-executable instructions, such as program code, executed by computers (e.g., apparatus 400 of FIG. 4).

At step 1801, a palette entry for palette coding a target CU can be received. For example, a decoder (e.g., decoder 300 of FIG. 3) can receive a bitstream including one or more palette entries (e.g., new_palette_entries[cIdx][i] in Table 3 of FIG. 9) for palette coding a target CU.

At step 1803, a determination can be made on whether the target CU is coded with separate luma and chroma trees. For example, the determination can be made on whether a condition (treeType!=SINGLE_TREE) is satisfied. If treeType!=SINGLE_TREE, the target CU can be determined to be coded with separate luma and chroma trees.

At step 1805, a determination can be made on whether the target CU is part of a single-tree slice. In some embodiments, method 1800 can include determining whether the target CU is part of a P slice or a B slice (e.g., slice_type!=I) or determining whether the target CU is part of a single tree I slice (e.g., qtbtt_dual_tree_intra_flag==0).

At step 1807, in response to the target CU being determined to be (a) coded with separate luma and chroma trees and (b) part of a single-tree slice, a first component of the target CU can be decoded based on the received palette entry, and a second component of the target CU can be decoded based on a default palette entry. In some embodiments, method 1800 can include: in response to the target CU being determined to be part of a P slice or a B slice or be part of a single tree I slice, decoding the first and second components of the target CU based on the received palette entry. The first component is luma component and the second component is chroma component, or the first component is chroma component and the second component is luma component.

In some embodiments, method 1800 can include receiving a reuse flag for reusing a palette entry to palette code the target CU and updating a palette predictor of the target CU based on the received palette entry and the received reuse flag. In some embodiments, a size of the palette predictor of the target CU is in a range of 0 to 63, inclusive. In some embodiments, method 1800 can include updating a palette predictor of the target CU based on the received palette entry. In some embodiments, the palette predictor of the target CU is not updated after the first component and the second component are decoded.

Figure 19:
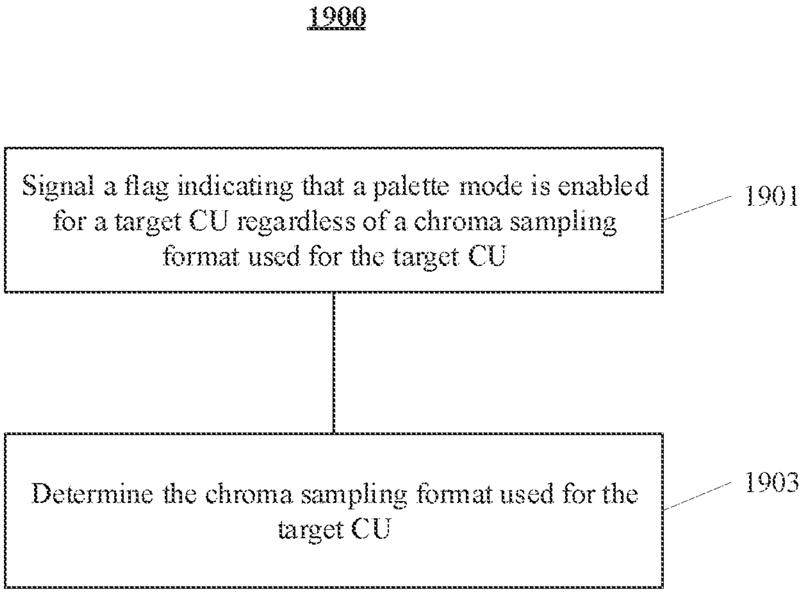
FIG. 19 illustrates a flowchart of another exemplary video processing method, according to some embodiments of the present disclosure.

FIG. 19 illustrates a flowchart of an exemplary video processing method 1900, according to some embodiments of the present disclosure. In some embodiments, method 1900 can be performed by an encoder (e.g., encoder 200 of FIG. 2), a decoder (e.g., decoder 300 of FIG. 3) or one or more software or hardware components of an apparatus (e.g., apparatus 400 of FIG. 4). For example, a processor (e.g., processor 402 of FIG. 4) can perform method 1900. In some embodiments, method 1900 can be implemented by a computer program product, embodied in a computer-readable medium, including computer-executable instructions, such as program code, executed by computers (e.g., apparatus 400 of FIG. 4).

At step 1901, method 1900 can include signaling a flag indicating that a palette mode is enabled for a target CU. The flag can be signaled regardless of whether a chroma sampling format is used for the target CU. In some embodiments, the flag is signaled in a SPS. The chroma sampling format can include one or more of 4:4:4 format, 4:2:2 format, or 4:2:0 format.

At step 1903, method 1900 can also include determining the chroma sampling format used for the target CU (e.g., 4:4:4 format, 4:2:2 format, or 4:2:0 format). In some embodiments, method 1900 can include: based on the determined chroma sampling format (e.g., 4:4:4 format), signaling corresponding syntax elements (e.g., syntax element sps_act_enabled_flag in Table 1 of FIG. 7).

Figure 20:
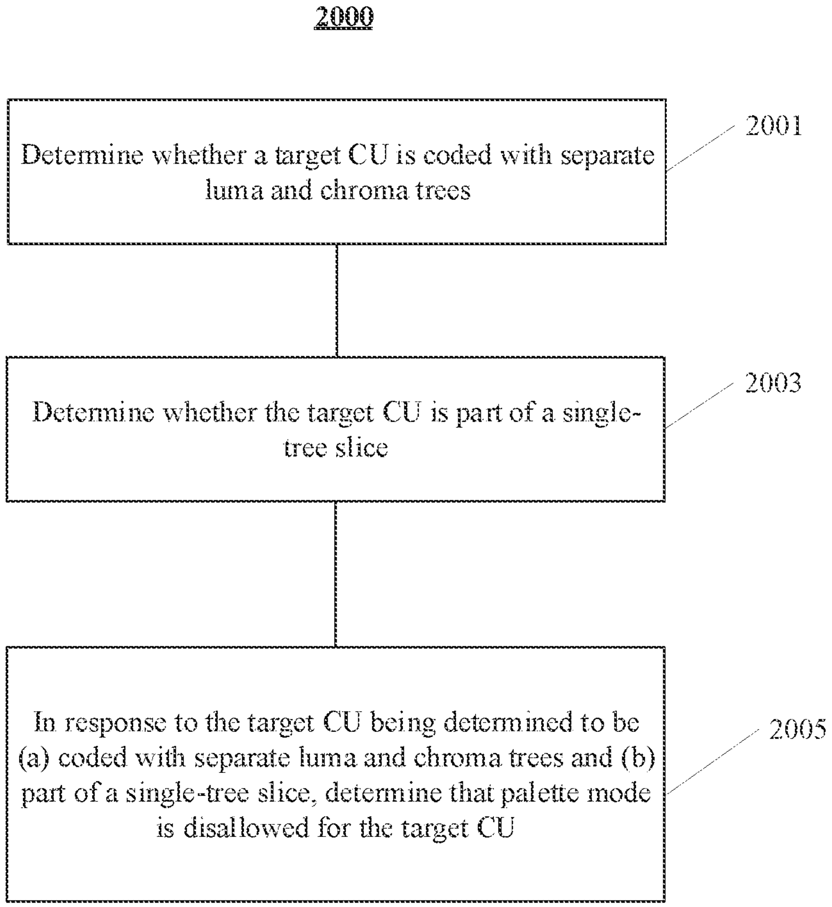
FIG. 20 illustrates a flowchart of another exemplary video processing method, according to some embodiments of the present disclosure.

FIG. 20 illustrates a flowchart of an exemplary video processing method 2000, according to some embodiments of the present disclosure. In some embodiments, method 2000 can be performed by an encoder (e.g., encoder 200 of FIG. 2), a decoder (e.g., decoder 300 of FIG. 3) or one or more software or hardware components of an apparatus (e.g., apparatus 400 of FIG. 4). For example, a processor (e.g., processor 402 of FIG. 4) can perform method 2000. In some embodiments, method 2000 can be implemented by a computer program product, embodied in a computer-readable medium, including computer-executable instructions, such as program code, executed by computers (e.g., apparatus 400 of FIG. 4).

At step 2001, a determination can be made on whether the target CU is coded with separate luma and chroma trees. For example, the determination can be made on whether a condition (treeType!=SINGLE_TREE) is satisfied. If treeType!=SINGLE_TREE, the target CU can be determined to be coded with separate luma and chroma trees.

At step 2003, a determination can be made on whether the target CU is part of a single-tree slice. In some embodiments, method 2000 can include determining whether the target CU is part of a P slice or a B slice (e.g., slice_type!=I) or determining whether the target CU is part of a single tree I slice (e.g., qtbtt_dual_tree_intra_flag==0).

At step 2005, in response to the target CU being determined to be (a) coded with separate luma and chroma trees and (b) part of a single-tree slice, palette mode can be determined to be disallowed for the target CU (e.g., Table 2 of FIG. 8).

Figure 21:
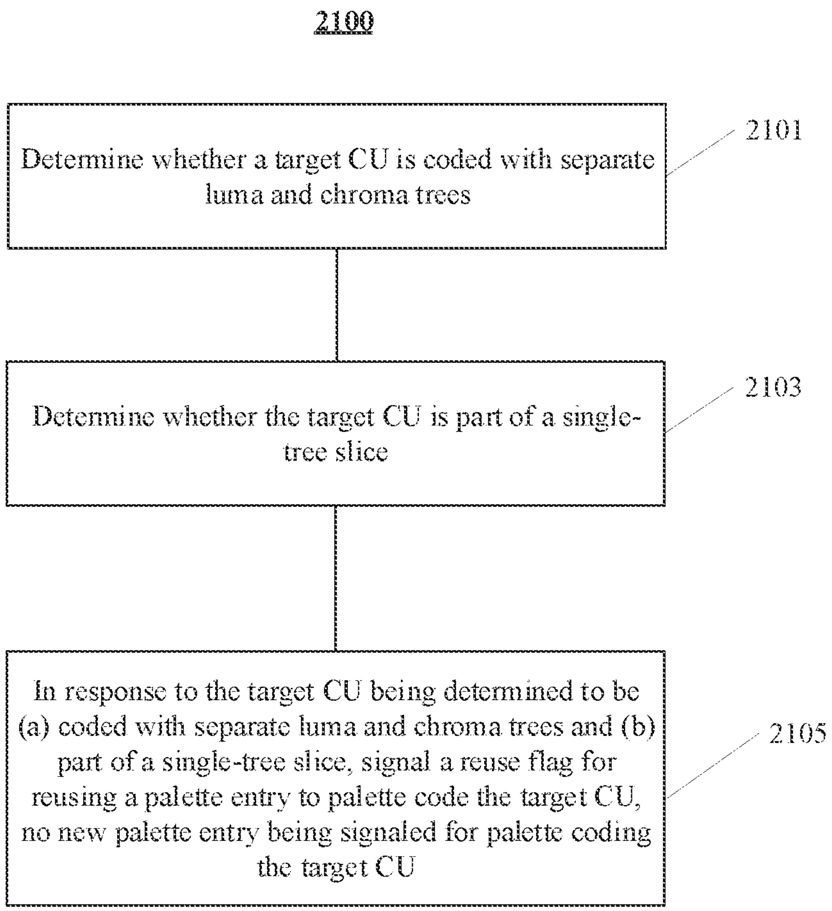
FIG. 21 illustrates a flowchart of another exemplary video processing method, according to some embodiments of the present disclosure.

FIG. 21 illustrates a flowchart of an exemplary video processing method 2100, according to some embodiments of the present disclosure. In some embodiments, method 2100 can be performed by an encoder (e.g., encoder 200 of FIG. 2), a decoder (e.g., decoder 300 of FIG. 3) or one or more software or hardware components of an apparatus (e.g., apparatus 400 of FIG. 4). For example, a processor (e.g., processor 402 of FIG. 4) can perform method 2100. In some embodiments, method 2100 can be implemented by a computer program product, embodied in a computer-readable medium, including computer-executable instructions, such as program code, executed by computers (e.g., apparatus 400 of FIG. 4).

At step 2101, a determination can be made on whether the target CU is coded with separate luma and chroma trees. For example, the determination can be made on whether a condition (treeType!=SINGLE_TREE) is satisfied. If treeType!=SINGLE_TREE, the target CU can be determined to be coded with separate luma and chroma trees.

At step 2103, a determination can be made on whether the target CU is part of a single-tree slice. In some embodiments, method 2100 can include determining whether the target CU is part of a P slice or a B slice (e.g., slice_type!=I) or determining whether the target CU is part of a single tree I slice (e.g., qtbtt_dual_tree_intra_flag==0).

At step 2105, in response to the target CU being determined to be (a) coded with separate luma and chroma trees and (b) part of a single-tree slice, a reuse flag for reusing a palette entry to palette code the target CU can be signaled. No new palette entry is signaled for palette coding the target CU (e.g., Table 3 of FIG. 9).

In some embodiments, method 2100 can include: in response to the target CU being determined to be not (a) coded with separate luma and chroma trees or (b) part of a single-tree slice, signaling a palette entry for palette coding the target CU (e.g., Table 3 of FIG. 9).

In some embodiments, method 2100 can include: determining whether a pixel in the target CU only contains luma component, and in response to the pixel being determined to only contain luma component, only signaling luma palette escape value for the pixel if the pixel is coded using escape mode CU (e.g., Table 3 of FIG. 9).

Figure 22:
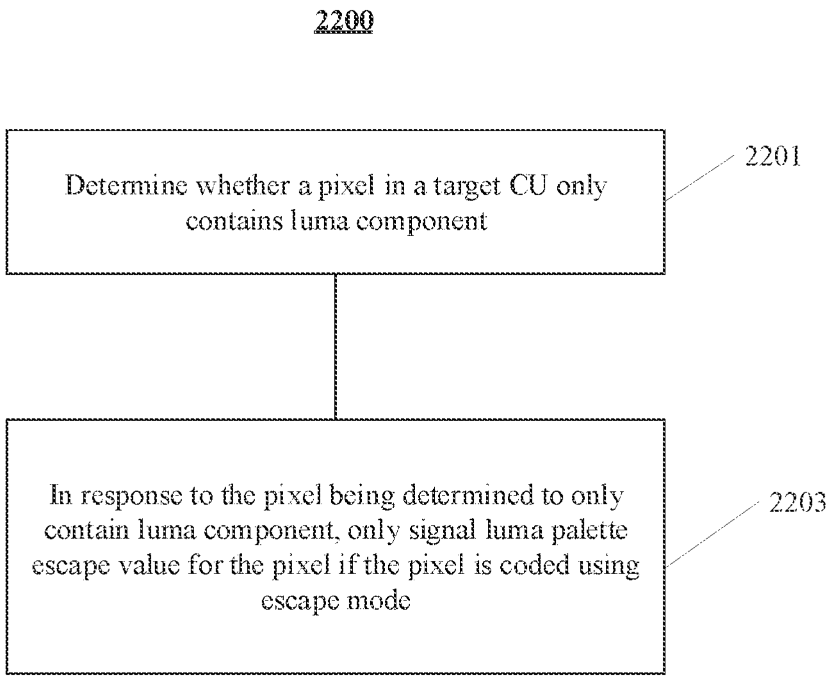
FIG. 22 illustrates a flowchart of another exemplary video processing method, according to some embodiments of the present disclosure.

FIG. 22 illustrates a flowchart of an exemplary video processing method 2200, according to some embodiments of the present disclosure. In some embodiments, method 2200 can be performed by an encoder (e.g., encoder 200 of FIG. 2), a decoder (e.g., decoder 300 of FIG. 3) or one or more software or hardware components of an apparatus (e.g., apparatus 400 of FIG. 4). For example, a processor (e.g., processor 402 of FIG. 4) can perform method 2200. In some embodiments, method 2200 can be implemented by a computer program product, embodied in a computer-readable medium, including computer-executable instructions, such as program code, executed by computers (e.g., apparatus 400 of FIG. 4).

At step 2201, a determination can be made on whether a pixel in a target coding unit (CU) only contains luma component. At step 2203, in response to the pixel being determined to only contain luma component, only luma palette escape value for the pixel can be signaled if the pixel is coded using escape mode (e.g., Table 4 of FIG. 11).

Figure 23:
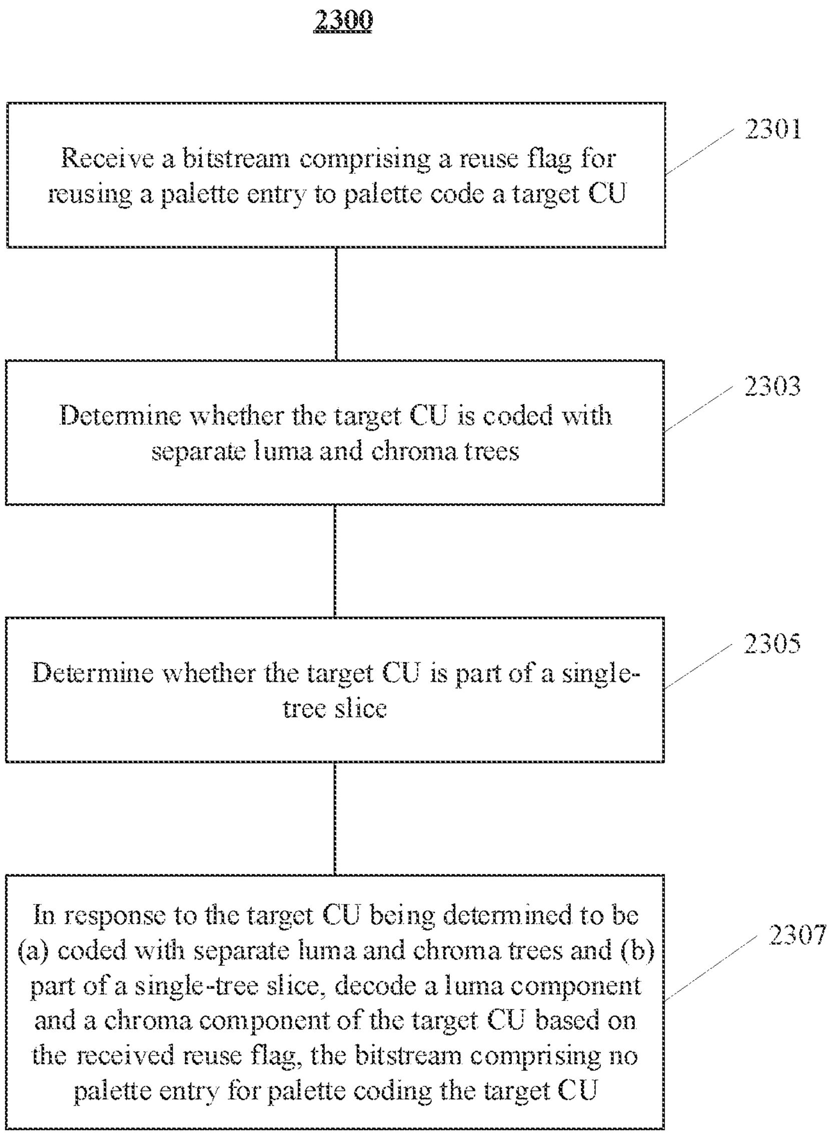
FIG. 23 illustrates a flowchart of another exemplary video processing method, according to some embodiments of the present disclosure.

FIG. 23 illustrates a flowchart of an exemplary video processing method 2300, according to some embodiments of the present disclosure. In some embodiments, method 2300 can be performed by a decoder (e.g., decoder 300 of FIG. 3) or one or more software or hardware components of an apparatus (e.g., apparatus 400 of FIG. 4). For example, a processor (e.g., processor 402 of FIG. 4) can perform method 2300. In some embodiments, method 2300 can be implemented by a computer program product, embodied in a computer-readable medium, including computer-executable instructions, such as program code, executed by computers (e.g., apparatus 400 of FIG. 4).

At step 2301, a bitstream can be received. The bitstream can include a reuse flag for reusing a palette entry to palette code a target CU. For example, a decoder (e.g., decoder 300 of FIG. 3) can receive a bitstream including one or more reuse flags (e.g., palette_predictor_run in Table 3 of FIG. 9) for reusing a palette entry to palette code a target CU.

At step 2303, a determination can be made on whether the target CU is coded with separate luma and chroma trees. For example, the determination can be made on whether a condition (treeType!=SINGLE_TREE) is satisfied. If treeType!=SINGLE_TREE, the target CU can be determined to be coded with separate luma and chroma trees.

At step 2305, a determination can be made on whether the target CU is part of a single-tree slice. In some embodiments, method 2300 can include determining whether the target CU is part of a P slice or a B slice (e.g., slice_type!=I) or determining whether the target CU is part of a single tree I slice (e.g., qtbtt_dual_tree_intra_flag==0).

At step 2307, in response to the target CU being determined to be (a) coded with separate luma and chroma trees and (b) part of a single-tree slice, a luma component and a chroma component of the target CU can be decoded based on the received reuse flag. The received bitstream does not include palette entry for palette coding the target CU. In some embodiments, method 2300 can include: in response to the target CU being determined to be part of a P slice or a B slice or be part of a single tree I slice, decoding the luma component and the chroma component of the target CU based on the received reuse flag and a palette entry for palette coding the target CU in the bitstream.

In some embodiments, method 2300 can include updating a palette predictor of the target CU based on the received reuse flag. Method 230 can also include: in response to the target CU being determined to be part of a P slice or a B slice or be part of a single tree I slice, updating a palette predictor of the target CU based on the received reuse flag and a palette entry for palette coding the target CU in the bitstream. In some embodiments, a size of the palette predictor of the target CU is in a range of 0 to 63, inclusive.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The embodiments may further be described using the following clauses:

1. A video processing method, comprising:
   receiving a first palette entry for palette coding a target coding unit (CU);
   determining whether the target CU is part of a single-tree slice;
   determining whether the target CU is coded with separate luma and chroma trees; and
   in response to the target CU being determined to be part of a single-tree slice and be coded with separate luma and chroma trees,
      decoding a first component of the target CU based on the first palette entry, and
      decoding a second component of the target CU based on a default palette entry.
2. The method of clause 1, wherein receiving the first palette entry for palette coding the target CU comprises:
   receiving a flag associated with a second palette entry; and
   including the second palette entry in a palette predictor of the target CU based on the received flag.
3. The method of clause 2, wherein a size of the palette predictor of the target CU is in a range of 0 to 63, inclusive.
4. The method of any one of clauses 1-3, wherein receiving the first palette entry for palette coding the target CU comprises:
   updating a palette predictor of the target CU based on the first palette entry.
5. The method of any one of clauses 1-4, wherein determining whether the target CU is part of a single-tree slice comprises:
   determining whether the target CU is part of a P slice or a B slice; or
   determining whether the target CU is part of a single tree I slice.
6. The method of clause 5, further comprising:
   in response to the target CU being determined to be part of a P slice or a B slice or be part of a single tree I slice, decoding the first and second components of the target CU based on the first palette entry.
7. The method of any one of clauses 1-6, wherein:
   the first component is a luma component and the second component is a chroma component; or
   the first component is a chroma component and the second component is a luma component.
8. The method of clause 1, wherein a palette predictor of the target CU is not updated after the first component and the second component are decoded.
9. A video processing apparatus, comprising:
   at least one memory for storing instructions; and
   at least one processor configured to execute the instructions to cause the apparatus to perform:
      receiving a first palette entry for palette coding a target coding unit (CU);
      determining whether the target CU is part of a single-tree slice;
      determining whether the target CU is coded with separate luma and chroma trees; and
      in response to the target CU being determined to be part of a single-tree slice and be coded with separate luma and chroma trees,
         decoding a first component of the target CU based on the first palette entry, and decoding a second component of the target CU based on a default palette entry.

10. The apparatus of clause 9, wherein the at least one processor is configured to execute the instructions to cause the apparatus to perform:

receiving a flag associated with a second palette entry; and including the second palette entry in a palette predictor of the target CU based on the received flag.

11. The apparatus of clause 10, wherein a size of the palette predictor of the target CU is in a range of 0 to 63, inclusive.

12. The apparatus of any one of clauses 9-11, wherein the at least one processor is configured to execute the instructions to cause the apparatus to perform:

updating a palette predictor of the target CU based on the first palette entry.

13. The apparatus of any one of clauses 9-12, wherein the at least one processor is configured to execute the instructions to cause the apparatus to perform:

determining whether the target CU is part of a P slice or a B slice; or determining whether the target CU is part of a single tree I slice.

14. The apparatus of clause 13, wherein the at least one processor is configured to execute the instructions to cause the apparatus to perform:

in response to the target CU being determined to be part of a P slice or a B slice or be part of a single tree I slice, decoding the first and second components of the target CU based on the first palette entry.

15. The apparatus of any one of clauses 9-14, wherein the first component is a luma component and the second component is a chroma component; or the first component is a chroma component and the second component is a luma component.

16. The apparatus of clause 9, wherein a palette predictor of the target CU is not updated after the first component and the second component are decoded.

17. A non-transitory computer readable storage medium storing a set of instructions that are executable by one or more processing devices to cause a video processing apparatus to perform:

receiving a first palette entry for palette coding a target coding unit (CU);

determining whether the target CU is part of a single-tree slice;

determining whether the target CU is coded with separate luma and chroma trees; and in response to the target CU being determined to be part of a single-tree slice and be coded with separate luma and chroma trees, decoding a first component of the target CU based on the first palette entry, and decoding a second component of the target CU based on a default palette entry.

18. The non-transitory computer readable storage medium of clause 17, wherein the set of instructions are executable by the one or more processing devices to cause the video processing apparatus to perform:

receiving a flag associated with a second palette entry; and including the second palette entry in a palette predictor of the target CU based on the received flag.

19. The non-transitory computer readable storage medium of clause 18, wherein a size of the palette predictor of the target CU is in a range of 0 to 63, inclusive.

20. The non-transitory computer readable storage medium of any one of clause 17-19, wherein the set of instructions are executable by the one or more processing devices to cause the video processing apparatus to perform:

updating a palette predictor of the target CU based on the first palette entry.

21. The non-transitory computer readable storage medium of any one of clauses 17-20, wherein the set of instructions are executable by the one or more processing devices to cause the video processing apparatus to perform:

determining whether the target CU is part of a P slice or a B slice; or determining whether the target CU is part of a single tree I slice.

22. The non-transitory computer readable storage medium of clause 21, wherein the set of instructions are executable by the one or more processing devices to cause the video processing apparatus to perform:

in response to the target CU being determined to be part of a P slice or a B slice or be part of a single tree I slice, decoding the first and second components of the target CU based on the first palette entry.

23. The non-transitory computer readable storage medium of any one of clauses 17-22, wherein the first component is a luma component and the second component is a chroma component; or the first component is a chroma component and the second component is a luma component.

24. The non-transitory computer readable storage medium of clause 17, wherein a palette predictor of the target CU is not updated after the first component and the second component are decoded.

25. A video processing method, comprising:

signaling a flag indicating that a palette mode is enabled for a target coding unit (CU), wherein the flag is signaled regardless of whether a chroma sampling format is used for the target CU.

26. The method of clause 25, wherein the flag is signaled in a sequence parameter set (SPS).

27. The method of any one of clauses 25 and 26, wherein the chroma sampling format comprises one or more of:

4:4:4 format,

4:2:2 format, or

4:2:0 format.

28. A video processing method, comprising:

determining whether the target CU is part of a single-tree slice;

determining whether a target coding unit (CU) is coded with separate luma and chroma trees; and in response to the target CU being determined to be part of a single-tree slice and be coded with separate luma and chroma trees, determining that palette mode is disallowed for the target CU.

29. The method of clause 28, wherein determining whether the target CU is part of a single-tree slice comprises:

determining whether the target CU is part of a P slice or a B slice; or determining whether the target CU is part of a single tree I slice.

30. The method of clause 29, further comprising:

in response to the target CU being determined to be part of a P slice or a B slice or be part of a single tree I slice, determining that palette mode is allowed for the target CU.

31. A video processing method, comprising:
determining whether the target CU is part of a single-tree slice;
determining whether a target coding unit (CU) is coded with separate luma and chroma trees; and
in response to the target CU being determined to be part of a single-tree slice and be coded with separate luma and chroma trees, signaling a reuse flag for reusing a palette entry to palette code the target CU, wherein no new palette entry is signaled for palette coding the target CU.

32. The method of clause 31, wherein determining whether the target CU is part of a single-tree slice comprises:
determining whether the target CU is part of a P slice or a B slice; or
determining whether the target CU is part of a single tree I slice.

33. The method of any one of clauses 31 and 32, further comprising:
in response to that the target CU is not part of a single-tree slice or is not coded with separate luma and chroma trees, signaling a palette entry for palette coding the target CU.

34. The method of any one of clauses 31-33, further comprising:
determining whether a pixel in the target CU contains chroma component, the pixel being coded using escape mode; and
in response to that the pixel does not contain chroma component, signaling a luma palette escape value for the pixel, wherein no chroma palette escape value for the pixel is signaled.

35. A video processing method, comprising:
determining whether a pixel in a target coding unit (CU) contain chroma component, the pixel being coded using escape mode; and
in response to that the pixel does not contain chroma component, signaling a luma palette escape value, wherein no chroma palette escape value for the pixel is signaled.

36. A video processing method, comprising:
receiving a bitstream comprising a reuse flag for reusing a palette entry to palette code a target coding unit (CU);
determining whether the target CU is part of a single-tree slice;
determining whether the target CU is coded with separate luma and chroma trees; and
in response to the target CU being determined to be part of a single-tree slice and be coded with separate luma and chroma trees, decoding a luma component and a chroma component of the target CU based on the received reuse flag, the bitstream comprising no palette entry for palette coding the target CU that is part of a single-tree slice and is coded with separate luma and chroma trees.

37. The method of clause 36, further comprising:
updating a palette predictor of the target CU based on the received reuse flag.

38. The method of any one of clauses 36 and 37, wherein determining whether the target CU is part of a single-tree slice comprises:
determining whether the target CU is part of a P slice or a B slice; or
determining whether the target CU is part of a single tree I slice.

39. The method of clause 38, further comprising:
in response to the target CU being determined to be part of a P slice or a B slice or be part of a single tree I slice, decoding the luma component and the chroma component of the target CU based on the received reuse flag and a palette entry for palette coding the target CU in the bitstream.

40. The method of any one of clauses 38 and 39, further comprising:
in response to the target CU being determined to be part of a P slice or a B slice or be part of a single tree I slice, updating a palette predictor of the target CU based on the received reuse flag and a palette entry for palette coding the target CU in the bitstream.

41. The method of any one of clauses 37 and 40, wherein a size of the palette predictor of the target CU is in a range of 0 to 63, inclusive.

42. A video processing apparatus, comprising:
at least one memory for storing instructions; and
at least one processor configured to execute the instructions to cause the apparatus to perform:
signaling a flag indicating that a palette mode is enabled for a target coding unit (CU),
wherein the flag is signaled regardless of whether a chroma sampling format is used for the target CU.

43. The apparatus of clause 42, wherein the flag is signaled in a sequence parameter set (SPS).

44. The apparatus of any one of clauses 42 and 43, wherein the chroma sampling format comprises one or more of:
4:4:4 format,
4:2:2 format, or
4:2:0 format.

45. A video processing apparatus, comprising:
at least one memory for storing instructions; and
at least one processor configured to execute the instructions to cause the apparatus to perform:
determining whether the target CU is part of a single-tree slice;
determining whether a target coding unit (CU) is coded with separate luma and chroma trees; and
in response to the target CU being determined to be part of a single-tree slice and be coded with separate luma and chroma trees, determining that palette mode is disallowed for the target CU.

46. The apparatus of clause 45, wherein the at least one processor is configured to execute the instructions to cause the apparatus to perform:
determining whether the target CU is part of a P slice or a B slice; or
determining whether the target CU is part of a single tree I slice.

47. The apparatus of clause 46, wherein the at least one processor is configured to execute the instructions to cause the apparatus to perform:
in response to the target CU being determined to be part of a P slice or a B slice or be part of a single tree I slice, determining that palette mode is allowed for the target CU.

48. A video processing apparatus, comprising:
at least one memory for storing instructions; and
at least one processor configured to execute the instructions to cause the apparatus to perform:
determining whether the target CU is part of a single-tree slice;
determining whether a target coding unit (CU) is coded with separate luma and chroma trees; and in response to the target CU being determined to be part of a single-tree slice and be coded with separate luma and chroma trees, signaling a reuse flag for reusing a palette entry to palette code the target CU, wherein no new palette entry is signaled for palette coding the target CU.

49. The apparatus of clause 48, wherein the at least one processor is configured to execute the instructions to cause the apparatus to perform:
determining whether the target CU is part of a P slice or a B slice; or
determining whether the target CU is part of a single tree I slice.

50. The apparatus of any one of clauses 48 and 49, wherein the at least one processor is configured to execute the instructions to cause the apparatus to perform:
in response to that the target CU is not part of a single-tree slice or is not coded with separate luma and chroma trees, signaling a palette entry for palette coding the target CU.

51. The apparatus of any one of clauses 48-50, wherein the at least one processor is configured to execute the instructions to cause the apparatus to perform:
determining whether a pixel in the target CU contains chroma component, the pixel being coded using escape mode; and
in response to that the pixel does not contain chroma component, signaling a luma palette escape value for the pixel, wherein no chroma palette escape value for the pixel is signaled.

52. A video processing apparatus, comprising:
at least one memory for storing instructions; and
at least one processor configured to execute the instructions to cause the apparatus to perform:
determining whether a pixel in a target coding unit (CU) contain chroma component, the pixel being coded using escape mode; and
in response to that the pixel does not contain chroma component, signaling a luma palette escape value, wherein no chroma palette escape value for the pixel is signaled.

53. A video processing apparatus, comprising:
at least one memory for storing instructions; and
at least one processor configured to execute the instructions to cause the apparatus to perform:
receiving a bitstream comprising a reuse flag for reusing a palette entry to palette code a target coding unit (CU);
determining whether the target CU is part of a single-tree slice;
determining whether the target CU is coded with separate luma and chroma trees; and
in response to the target CU being determined to be part of a single-tree slice and be coded with separate luma and chroma trees, decoding a luma component and a chroma component of the target CU based on the received reuse flag, the bitstream comprising no palette entry for palette coding the target CU that is part of a single-tree slice and is coded with separate luma and chroma trees.

54. The apparatus of clause 53, wherein the at least one processor is configured to execute the instructions to cause the apparatus to perform:
updating a palette predictor of the target CU based on the received reuse flag.

55. The apparatus of any one of clauses 53 and 54, wherein the at least one processor is configured to execute the instructions to cause the apparatus to perform:
determining whether the target CU is part of a P slice or a B slice; or
determining whether the target CU is part of a single tree I slice.

56. The apparatus of clause 55, wherein the at least one processor is configured to execute the instructions to cause the apparatus to perform:
in response to the target CU being determined to be part of a P slice or a B slice or be part of a single tree I slice, decoding the luma component and the chroma component of the target CU based on the received reuse flag and a palette entry for palette coding the target CU in the bitstream.

57. The apparatus of any one of clauses 55 and 56, wherein the at least one processor is configured to execute the instructions to cause the apparatus to perform:
in response to the target CU being determined to be part of a P slice or a B slice or be part of a single tree I slice, updating a palette predictor of the target CU based on the received reuse flag and a palette entry for palette coding the target CU in the bitstream.

58. The apparatus of any one of clauses 54 and 57, wherein a size of the palette predictor of the target CU is in a range of 0 to 63, inclusive.

59. A non-transitory computer readable storage medium storing a set of instructions that are executable by one or more processing devices to cause a video processing apparatus to perform:
signaling a flag indicating that a palette mode is enabled for a target coding unit (CU),
wherein the flag is signaled regardless of whether a chroma sampling format is used for the target CU.

60. The non-transitory computer readable storage medium of clause 59, wherein the flag is signaled in a sequence parameter set (SPS).

61. The non-transitory computer readable storage medium of any one of clauses 59 and 60, wherein the chroma sampling format comprises one or more of:
4:4:4 format,
4:2:2 format, or
4:2:0 format.

62. A non-transitory computer readable storage medium storing a set of instructions that are executable by one or more processing devices to cause a video processing apparatus to perform:
determining whether the target CU is part of a single-tree slice;
determining whether a target coding unit (CU) is coded with separate luma and chroma trees; and
in response to the target CU being determined to be part of a single-tree slice and be coded with separate luma and chroma trees, determining that palette mode is disallowed for the target CU.

63. The non-transitory computer readable storage medium of clause 62, wherein the set of instructions are executable by the one or more processing devices to cause the video processing apparatus to perform:
determining whether the target CU is part of a P slice or a B slice; or
determining whether the target CU is part of a single tree I slice.

64. The non-transitory computer readable storage medium of clause 63, wherein the set of instructions are executable by the one or more processing devices to cause the video processing apparatus to perform:
    in response to the target CU being determined to be part of a P slice or a B slice or be part of a single tree I slice, determining that palette mode is allowed for the target CU.
65. A non-transitory computer readable storage medium storing a set of instructions that are executable by one or more processing devices to cause a video processing apparatus to perform:
    determining whether the target CU is part of a single-tree slice;
    determining whether a target coding unit (CU) is coded with separate luma and chroma trees; and
    in response to the target CU being determined to be part of a single-tree slice and be coded with separate luma and chroma trees, signaling a reuse flag for reusing a palette entry to palette code the target CU, wherein no new palette entry is signaled for palette coding the target CU.
66. The non-transitory computer readable storage medium of clause 65, wherein the set of instructions are executable by the one or more processing devices to cause the video processing apparatus to perform:
    determining whether the target CU is part of a P slice or a B slice; or
    determining whether the target CU is part of a single tree I slice.
67. The non-transitory computer readable storage medium of any one of clauses 65 and 66, wherein the set of instructions are executable by the one or more processing devices to cause the video processing apparatus to perform:
    in response to that the target CU is not part of a single-tree slice or is not coded with separate luma and chroma trees, signaling a palette entry for palette coding the target CU.
68. The non-transitory computer readable storage medium of any one of clauses 65-67, wherein the set of instructions are executable by the one or more processing devices to cause the video processing apparatus to perform:
    determining whether a pixel in the target CU contains chroma component, the pixel being coded using escape mode; and
    in response to that the pixel does not contain chroma component, signaling a luma palette escape value for the pixel, wherein no chroma palette escape value for the pixel is signaled.
69. A non-transitory computer readable storage medium storing a set of instructions that are executable by one or more processing devices to cause a video processing apparatus to perform:
    determining whether a pixel in a target coding unit (CU) contain chroma component, the pixel being coded using escape mode; and
    in response to that the pixel does not contain chroma component, signaling a luma palette escape value, wherein no chroma palette escape value for the pixel is signaled.
70. A non-transitory computer readable storage medium storing a set of instructions that are executable by one or more processing devices to cause a video processing apparatus to perform:
    receiving a bitstream comprising a reuse flag for reusing a palette entry to palette code a target coding unit (CU);
    determining whether the target CU is part of a single-tree slice;
    determining whether the target CU is coded with separate luma and chroma trees; and
    in response to the target CU being determined to be part of a single-tree slice and be coded with separate luma and chroma trees, decoding a luma component and a chroma component of the target CU based on the received reuse flag, the bitstream comprising no palette entry for palette coding the target CU that is part of a single-tree slice and is coded with separate luma and chroma trees.
71. The non-transitory computer readable storage medium of clause 70, wherein the set of instructions are executable by the one or more processing devices to cause the video processing apparatus to perform:
    updating a palette predictor of the target CU based on the received reuse flag.
72. The non-transitory computer readable storage medium of any one of clauses 70 and 71, wherein the set of instructions are executable by the one or more processing devices to cause the video processing apparatus to perform:
    determining whether the target CU is part of a P slice or a B slice; or
    determining whether the target CU is part of a single tree I slice.
73. The non-transitory computer readable storage medium of clause 72, wherein the set of instructions are executable by the one or more processing devices to cause the video processing apparatus to perform:
    in response to the target CU being determined to be part of a P slice or a B slice or be part of a single tree I slice, decoding the luma component and the chroma component of the target CU based on the received reuse flag and a palette entry for palette coding the target CU in the bitstream.
74. The non-transitory computer readable storage medium of any one of clauses 72 and 73, wherein the set of instructions are executable by the one or more processing devices to cause the video processing apparatus to perform:
    in response to the target CU being determined to be part of a P slice or a B slice or be part of a single tree I slice, updating a palette predictor of the target CU based on the received reuse flag and a palette entry for palette coding the target CU in the bitstream.
75. The non-transitory computer readable storage medium of any one of clauses 72 and 74, wherein a size of the palette predictor of the target CU is in a range of 0 to 63, inclusive.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A video processing method, comprising:

receiving a first palette entry for palette coding a target coding unit (CU);

determining whether the target CU is part of a single-tree slice;

determining whether the target CU is coded with separate luma and chroma trees; and in response to the target CU being determined to be part of a single-tree slice and to be coded with separate luma and chroma trees, encoding a first component of the target CU based on the first palette entry, and encoding a second component of the target CU based on a default palette entry.

2. The method of claim 1, wherein receiving the first palette entry for palette coding the target CU comprises:

receiving a flag associated with a second palette entry; and including the second palette entry in a palette predictor of the target CU based on the received flag.

3. The method of claim 2, wherein a size of the palette predictor of the target CU is in a range of 0 to 63, inclusive.

4. The method of claim 1, wherein receiving the first palette entry for palette coding the target CU comprises:

updating a palette predictor of the target CU based on the first palette entry.

5. The method of claim 1, wherein determining whether the target CU is part of a single-tree slice comprises:

determining whether the target CU is part of a P slice or a B slice; or determining whether the target CU is part of a single tree I slice.

6. The method of claim 5, further comprising:

in response to the target CU being determined to be part of a P slice or a B slice or to be part of a single tree I slice, encoding the first and second components of the target CU based on the first palette entry.

7. The method of claim 1, wherein:

the first component is a luma component and the second component is a chroma component; or the first component is a chroma component and the second component is a luma component.

8. The method of claim 1, wherein a palette predictor of the target CU is not updated after the first component and the second component are encoded.

9. A non-transitory computer readable medium storing a bitstream, wherein the bitstream comprises:

a first palette entry for palette coding a target coding unit (CU);

a default palette entry for palette coding the target CU;

an indicator, indicating whether the target CU is part of a single-tree slice and whether the target CU is coded with separate luma and chroma trees;

wherein in response to the indicator indicating that the target CU is part of a single-tree slice and is coded with separate luma and chroma trees, a first component of the target CU is encoded based on the first palette entry; and a second component of the target CU is encoded based on the default palette entry.

10. The non-transitory computer readable medium of claim 9, wherein the bitstream further comprises:

a flag associated with a second palette entry; and a palette predictor of the target CU including the second palette entry, based on the flag.

11. The non-transitory computer readable medium of claim 10, wherein the bitstream further comprises:

a field indicating a size of the palette predictor of the target CU, in a range of 0 to 63, inclusive.

12. The non-transitory computer readable medium of claim 9, wherein the bitstream further comprises:

a reuse flag indicating whether to reuse a palette entry to palette code the target CU, wherein no new palette entry is signaled for palette coding the target CU.

13. A video decoder capable of being enabled to implement a palette mode for a non 4:4:4 color format, the non 4:4:4 color format including at least one of a 4:2:0 color format, a 4:2:2 color format, or a monochrome color format, the video decoder comprising:

means for receiving a first palette entry for palette coding a target coding unit (CU);

means for determining whether the target CU is part of a single-tree slice;

means for determining whether the target CU is coded with separate luma and chroma trees; and means for, in response to the target CU being determined to be part of a single-tree slice and to be coded with separate luma and chroma trees, decoding a first component of the target CU based on the first palette entry, and decoding a second component of the target CU based on a default palette entry.

* * * * *